United States Patent
Ironmonger et al.

(10) Patent No.: US 10,350,490 B2
(45) Date of Patent: Jul. 16, 2019

(54) GAMES CONTROLLER

(71) Applicant: Ironburg Inventions Ltd., Wincanton, Somerset (GB)

(72) Inventors: Duncan Ironmonger, Suwanee, GA (US); Carl S. Jeffrey, Cheltenham (GB)

(73) Assignee: Ironburg Inventions Limited, Wincanton (GB)

( * ) Notice: Subject to any disclaimer, the term of this patent is extended or adjusted under 35 U.S.C. 154(b) by 0 days.

(21) Appl. No.: 15/628,780

(22) Filed: Jun. 21, 2017

(65) Prior Publication Data
US 2018/0140943 A1 May 24, 2018

Related U.S. Application Data

(60) Provisional application No. 62/349,859, filed on Jun. 14, 2016.

(51) Int. Cl.
| | |
|---|---|
| A63F 13/24 | (2014.01) |
| A63F 13/21 | (2014.01) |
| G06F 3/00 | (2006.01) |
| A63F 13/20 | (2014.01) |

(52) U.S. Cl.
CPC .............. *A63F 13/24* (2014.09); *A63F 13/20* (2014.09); *A63F 13/21* (2014.09); *G06F 3/00* (2013.01); *A63F 2300/1006* (2013.01); *A63F 2300/1043* (2013.01)

(58) Field of Classification Search
None
See application file for complete search history.

(56) References Cited

U.S. PATENT DOCUMENTS

| | | |
|---|---|---|
| 4,032,728 A | 6/1977 | Oelsch |
| 4,786,768 A | 11/1988 | Langewis et al. |
| 5,430,262 A | 7/1995 | Matsui et al. |
| 5,451,053 A | 9/1995 | Garrido |
| 5,773,769 A | 6/1998 | Raymond |

(Continued)

FOREIGN PATENT DOCUMENTS

| | | |
|---|---|---|
| EP | 1 208 883 | 5/2002 |
| EP | 1852162 | 11/2007 |

(Continued)

OTHER PUBLICATIONS

International Search Report, PCT/EP2015/051290 (dated 2015).

(Continued)

*Primary Examiner* — Damon J Pierce
(74) *Attorney, Agent, or Firm* — Walters & Wasylyna LLC

(57) ABSTRACT

The invention provides a controller and an actuator for mounting to a controller, enables a user with access to a plurality (two or more) of control functions from a single actuator. In particular, the present disclosure provides an actuator which in normal use is hidden from view for example, but not limited to, by being mounted to the rear of a controller. It is therefore desirable that the actuator can be readily found by touch and that the user can readily find a desired control function. The actuator comprises a plurality of distinct or distinguishable degrees of freedom of movement, when mounted to the controller, the actuator requires specific actuation gestures, manipulations or actions to activate a desired one of a plurality of control functions associated with the actuator.

43 Claims, 14 Drawing Sheets

(56) References Cited

U.S. PATENT DOCUMENTS

| | | |
|---|---|---|
| 5,841,372 A | 11/1998 | Matsumoto |
| 5,874,906 A | 2/1999 | Willner et al. |
| 5,989,123 A | 11/1999 | Tosaki et al. |
| 6,203,432 B1 | 3/2001 | Roberts et al. |
| 6,251,015 B1 | 6/2001 | Caprai |
| 6,512,511 B2 | 1/2003 | Willner et al. |
| 6,752,719 B2 | 6/2004 | Himoto et al. |
| 6,760,013 B2 | 7/2004 | Willner et al. |
| 6,853,308 B1 | 2/2005 | Dustin |
| 7,510,477 B2 | 3/2009 | Argentar |
| 7,758,424 B2 | 7/2010 | Riggs et al. |
| 7,859,514 B1 | 12/2010 | Park |
| 8,641,525 B2 | 2/2014 | Burgess et al. |
| 8,777,620 B1 | 7/2014 | Baxter |
| 9,089,770 B2 | 7/2015 | Burgess et al. |
| 9,804,691 B1 | 10/2017 | Strahle et al. |
| 2001/0003713 A1 | 6/2001 | Willner et al. |
| 2001/0025778 A1 | 10/2001 | Ono |
| 2002/0052237 A1 | 5/2002 | Magill |
| 2002/0128064 A1 | 9/2002 | Sobota |
| 2003/0067111 A1 | 4/2003 | Swan |
| 2004/0259059 A1 | 12/2004 | Aoki |
| 2005/0083297 A1 | 4/2005 | Duncan |
| 2005/0215321 A1 | 9/2005 | Hussaini et al. |
| 2005/0230230 A1 | 10/2005 | Ueshima et al. |
| 2005/0255915 A1 | 11/2005 | Riggs et al. |
| 2005/0255918 A1 | 11/2005 | Riggs et al. |
| 2006/0025217 A1 | 2/2006 | Hussaini et al. |
| 2006/0116204 A1 | 6/2006 | Chen et al. |
| 2007/0281787 A1 | 12/2007 | Numata et al. |
| 2008/0261695 A1 | 10/2008 | Coe |
| 2009/0088250 A1 | 4/2009 | Carlson |
| 2009/0258705 A1 | 10/2009 | Guinchard |
| 2010/0073283 A1 | 3/2010 | Enright |
| 2010/0267454 A1 | 10/2010 | Navid |
| 2010/0304865 A1 | 12/2010 | Picunko |
| 2011/0256930 A1 | 10/2011 | Jaouen |
| 2011/0281649 A1 | 11/2011 | Jaouen |
| 2012/0088582 A1 | 4/2012 | Wu et al. |
| 2012/0142418 A1 | 6/2012 | Muramatsu |
| 2012/0142419 A1 | 6/2012 | Muramatsu |
| 2012/0260220 A1 | 10/2012 | Griffin |
| 2012/0299244 A1 | 11/2012 | Rice et al. |
| 2012/0322553 A1 | 12/2012 | Burgess et al. |
| 2012/0322555 A1 | 12/2012 | Burgess et al. |
| 2013/0147610 A1 | 6/2013 | Grant et al. |
| 2013/0150155 A1 | 6/2013 | Barney et al. |
| 2013/0196770 A1 | 8/2013 | Barney et al. |
| 2014/0274397 A1 | 9/2014 | Sebastian |
| 2015/0234479 A1 | 8/2015 | Schantz et al. |
| 2015/0238855 A1 | 8/2015 | Uy et al. |
| 2016/0082349 A1 | 3/2016 | Burgess et al. |
| 2016/0193529 A1 | 7/2016 | Burgess et al. |
| 2016/0346682 A1 | 12/2016 | Burgess et al. |
| 2017/0001107 A1 | 1/2017 | Burgess et al. |
| 2017/0001108 A1 | 1/2017 | Burgess et al. |
| 2017/0087456 A1 | 3/2017 | Burgess et al. |
| 2017/0151494 A1 | 6/2017 | Ironmonger et al. |
| 2017/0157509 A1 | 6/2017 | Burgess et al. |

FOREIGN PATENT DOCUMENTS

| | | |
|---|---|---|
| EP | 2 479 636 | 7/2012 |
| EP | 2 440 438 | 4/2013 |
| EP | 2 698 185 | 2/2015 |
| GB | 2 244 546 | 12/1991 |
| GB | 2 481 633 | 1/2012 |
| JP | H1020951 | 1/1998 |
| JP | 2001 084077 | 3/2001 |
| WO | WO 02/34345 | 5/2002 |
| WO | WO 03/046822 | 6/2003 |
| WO | WO 2008/131249 | 10/2008 |
| WO | WO 2012/036710 | 3/2012 |
| WO | WO2014/187923 | 11/2014 |
| WO | 2015004261 | 1/2015 |
| WO | 2015110553 | 7/2015 |

OTHER PUBLICATIONS

International Search Report, PCT/EP2014/075851 (dated 2015).
International Search Report, PCT/EP2014/075861 (dated 2015).
International Search Report, PCT/EP2014/060587 (dated 2014).
International Search Report, PCT/EP2015/058096 (dated 2015).
Written Opinion of the International Searching Authority, PCT/EP2015/058096 (dated 2015).
Burns, "Review: Scuf Xbox 360 Controller," Xboxer360.com (2010).
Combined Search and Examination Report, GB1011078.1 (dated 2011).
"Rapid Fire Mod for Wireless Xbox 360 Controller," forum on xbox-scene.com, (2008).
"Thrustmaster USB game controller roundup," dansdata.com/tmsticks.htm (2002).
Office Action, U.S. Appl. No. 14/832,211 (dated 2015).
Office Action, U.S. Appl. No. 14/736,771 (dated 2015).
Office Action, U.S. Appl. No. 14/805,597 (dated 2015).
Office Action, U.S. Appl. No. 14/805,641 (dated 2015).
Corrected Petition for Inter Partes Review of U.S. Pat. No. 9,089,770, Under 37 C.F.R. § 42.100, filed by Valve Corporation, Case IPR2016-00949 (2016).
Corrected Petition for Inter Partes Review of U.S. Pat. No. 8,641,525, Under 37 C.F.R. § 42.100, filed by Valve Corporation, Case IPR2016-00948 (2016).
Xbox 360 Wireless Controller Tour, published on May 13, 2005 at http://www.ign.com/articles/2005/05/13/xbox-360-wireless-controller-tour.
World Intellectual Property Office, International Search Report, PCT/GB2016/053712 (dated Feb. 27, 2017).

GAMES CONTROLLER

PRIORITY

This application is a nonprovisional of, and claims priority from, U.S. Ser. No. 62/349,859 filed on Jun. 14, 2016, the entire contents of which are incorporated herein by reference.

FIELD

The invention relates to controllers for controlling the play of computerized games; more particularly, but not exclusively, the invention relates to a multifunction actuator system of a game controller for a gaming console.

BACKGROUND

There are many different types of gaming consoles currently available for operating a video game. For example, Microsoft®, Sony® and Nintendo® manufacture the Xbox®, PlayStation® and Wii® gaming consoles, respectively. The gaming consoles typically include a game controller so that a user can control the operation of the video game.

Controllers for most current games consoles are generally intended to be held and operated by the user using both hands. A conventional controller will generally comprise a hard outer case with a plurality of controls mounted about the controller. Typically, the controls include buttons, analogue control sticks, bumpers and triggers.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button, actuator, or other controls, on the front and top of the controller. Controls mounted on the top of the controller are intended to be operable by the index fingers of a user; such buttons are commonly known as triggers or bumpers. Controls mounted on the front of the controller are intended to be operable by the thumbs of a user; such controls may include left and right analogue thumb sticks, which normally control movement and are intended to be operated by the user's left and right thumbs respectively. There may be additional buttons located on a forward right portion of the front of the controller, which normally control additional actions and are intended to be operated by the user's right thumb. There may be provided a direction pad located on the rearward left portion of the front of the controller. The direction pad is intended to be operated by the user's left thumb, typically either as an alternative to the left thumb stick or to provide additional actions. The controllers typically have a pair of handles or grip portions to enable a user to hold the controller; typically the user will employ the middle, ring and/or little finger of each hand to grasp a respective handle.

Due to the rapidly expanding gaming market and development of involved games invoking considerable player input, it is desirable for players to be able to customize their controllers in order to gain increased control in a variety of gaming circumstances.

The present invention seeks to improve upon, or at least mitigate, some of the problems associated with controllers of the prior art by providing a game controller which includes additional actuators on the bottom of the controller, which allow a user to employ the middle, ring or little finger of the hand for operation of control of the functions of a video game.

A further object of the present invention is to provide a user with access to a plurality (two or more) of control functions from an actuator, in particular an actuator mounted to the rear of a controller which in normal use is hidden from view. It is therefore desirable that the actuator can be readily found by touch and that the user can readily find a desired control function, in this regard it is an object of the present invention to provide an actuator having a plurality of distinct or distinguishable degrees of freedom of movement requiring specific actuation gestures, manipulations or actions to activate a control function associated therewith.

SUMMARY

A first aspect of the present disclosure provides an apparatus for supplying user inputs to a computer program, the apparatus comprising:
 a case having a first part of a complementary mounting mechanism;
 a plurality of sensors each of the plurality of sensors configured to initiate a control function; and
 at least one first actuator comprising:
 a first end and a second end opposing the first end;
 a second part of a complementary mounting mechanism disposed proximate the first end;
 wherein the second part of a complementary mounting mechanism mates with the first part of the complementary mounting mechanism to couple the at least one first actuator to the case, such that the second end of the at least one first actuator is a free to move with respect to the first end of the at least one first actuator and with respect to the case;
 the at least one first actuator further comprising a plurality of degrees of freedom of movement, when mounted to the case, such that the at least one first actuator can interact with each of the plurality of sensors.

Optionally, the at least one first actuator requires a specific actuation manipulation to activate each of a plurality of control functions associated with the at least one first actuator.

Optionally, the at least one first actuator substantially elongate in shape, and comprises an elongate axis defined between the first end and the second end.

Optionally, the at least one first actuator is pivotally coupled to the case about at least two orthogonal axes so as to be rotatable in at least two orthogonal planes.

Optionally, the at least one first actuator is flexible so as to be deformable in at least one plane.

Optionally, the at least one first actuator is flexible so as to be deformable in at least two orthogonal planes.

Optionally, the at least one first actuator is pivotally coupled to the case about at least one axis and is flexible so as to, deformable or other displacement about a further orthogonal axis.

Optionally, the at least one first actuator comprises at least two displaceable portions each of which can be independently displaced about at least one axis.

Optionally, the at least one first actuator comprises a head portion to which the at least two independently displaceable portions are each mounted, the head portion being mounted to the case of the apparatus.

Optionally, comprising a first sensor activateable by a first displaceable portion to initiate a first control function and a second sensor activateable by a second displaceable portion to initiate a second control function.

Optionally, the first sensor and the second sensor can be simultaneously activated by a respective one of the first and second displaceable portions to initiate a third control function.

Optionally, the at least one actuator is translationally mounted to the case so as to be activateable by linear movement.

Optionally, the at least one actuator is slidably mounted to the case such that the at least one actuator is linearly moveable along the elongate axis.

Optionally, the apparatus comprises a sensor which is normally in a closed condition, and a resilient biasing mechanism which urges the at least one actuator into a rest position so as to act upon the sensor to place the sensor in an open condition.

Optionally, the case comprises a chamber in which a portion of the at least one actuator and at least a portion of the sensor and the resilient biasing mechanism are mounted.

Optionally, the at least one actuator comprises flange which comprises an engagement surface for a user's finger.

Optionally, the at least one actuator comprises pair of wing portion extending laterally from side edges of the at least one actuator.

Optionally, a first wing portion facilitates rotation of the at least one actuator in a clockwise direction about the elongate axis, and a second wing portion facilitates rotation of the at least one actuator in a counter-clockwise direction about the elongate axis.

Optionally, the apparatus comprises a pair of sensors each of which mounted in vertical registry with a respective one of the pair of wing portions.

Optionally, the at least one actuator comprises a head portion and a main body portion, the main body portion being detachably mounted to the head portion.

Optionally, the actuator is mounted to the case by a ball and socket arrangement.

Optionally, the actuator is mounted to the case by a spherical bearing.

Optionally, the actuator is mounted to the case by a trunnion and cradle arrangement.

Optionally, cradle defines a receiver in the form of a channel, the lug being inserted into the receiver by linear translation along a longitudinal axis of the receiver, the longitudinal axis of the receiver defining a pivot axis about which the actuators rotate.

Optionally, the actuator comprises a head portion defining the trunnion and main body portion coupled to the head portion by a shaft, the shaft being rotationally coupled to the head portion.

Optionally, the apparatus comprises a pair of sensors arranged in opposition to each other.

Optionally, the apparatus comprises a first sensor mounted in a first orientation and a second sensor mounted in a second orientation, and wherein the at least one actuator is manipulable to activate each of the first and second sensors individually.

Optionally, the second orientation is arranged orthogonally with respect to the first orientation.

Optionally, the apparatus comprises a first sensor disposed proximate a first side edge of the actuator.

Optionally, the apparatus comprises a linkage in communication with the first sensor and the actuator.

Optionally, a portion of the linkage passes through an opening in the case.

Optionally, the actuator comprises a lug passing through an opening in the case and the apparatus comprises a first sensor disposed on a first side of the lug and a second sensor disposed on second side of the lug.

Optionally, the actuator comprises a main body portion shaped to receive a user's finger between a pair of substantially opposing engagement surfaces.

Optionally, the actuator comprises at least one ridge for providing a pair of opposing engagement surfaces.

Optionally, the at least one ridge is oriented to extend substantially parallel with the elongate axis.

Optionally, the apparatus comprises a channel in the case, at least a portion of the actuator being disposed in the channel, the channel comprising opposing side walls and base wall.

Optionally, at least one the opposing side walls of the channel comprises at least one sensor.

Optionally, the base walls of the channel comprises at least one sensor.

Optionally, the apparatus comprises an end stop for limiting movement of the actuator in at least one plane.

A second aspect of the present disclosure provides an actuator for use with apparatus for supplying user inputs to a computer program, such as a game program, for controlling the game program, the apparatus comprising:

a case having a first part of an actuator mounting mechanism;

a plurality of sensors each of the plurality of sensors configured to initiate a control function; and the actuator comprising:

a first end and a second end opposing the first end;

a second part of an actuator mounting mechanism disposed proximate the first end;

wherein the first and second parts of the actuator mounting mechanism are cooperable to enable the second end of the actuator to move with respect to the first end of the actuator and with respect to the case;

the actuator comprising a plurality of degrees of freedom of movement, when mounted to the case, such that the actuator can interact with each of the plurality of sensors.

Optionally, the actuator requires a specific actuation manipulation to activate each of a plurality of control functions associated with the actuator.

Optionally, the actuator is substantially elongate in shape, and comprises an elongate axis defined between the first end and the second end.

Optionally, the actuator is pivotally coupleable to the case about at least two orthogonal axes so as to be rotatable in at least two orthogonal planes.

Optionally, the actuator is flexible so as to be deformable in at least one plane.

Optionally, the actuator is flexible so as to be deformable in at least two orthogonal planes.

Optionally, the actuator is pivotally coupleable to the case about at least one axis and is flexible so as to, deformable or other displacement about a further orthogonal axis.

Optionally, the actuator comprises at least two displaceable portions each of which can be independently displaced about at least one axis.

Optionally, the actuator comprises a head portion to which the at least two independently displaceable portions are each mounted, the head portion being mountable to the case of the apparatus.

Optionally, the actuator is translationally mountable to the case so as to be activateable by linear movement.

Optionally, the at least one actuator is slidably mountable to the case such that the actuator is linearly moveable in a direction substantially parallel to the elongate axis.

Optionally, the actuator comprises flange which comprises an engagement surface for a user's finger.

Optionally, the actuator comprises pair of wing portions extending laterally from side edges of the actuator.

Optionally, a first wing portion facilitates rotation of the actuator in a clockwise direction about the elongate axis, and a second wing portion facilitates rotation of the actuator in a counter-clockwise direction about the elongate axis.

Optionally, the actuator comprises a head portion and a main body portion, the main body portion being detachably mounted to the head portion.

Optionally, the actuator is mountable to the case by a ball and socket arrangement.

Optionally, the actuator is mountable to the case by a spherical bearing.

Optionally, the actuator is mountable to the case by a trunnion and cradle arrangement.

Optionally, the actuator comprises a head portion defining the trunnion and a main body portion coupled to the head portion by a shaft, the shaft being rotationally coupled to the head portion.

Optionally, the actuator comprises a lug for passing through an opening in the case and the apparatus comprises a first sensor disposed on a first side of the lug and a second sensor disposed on second side of the lug.

Optionally, the actuator comprises a main body portion shaped to receive a user's finger between a pair of substantially opposing engagement surfaces.

Optionally, the actuator comprises at least one ridge for providing a pair of opposing engagement surfaces.

Optionally, the at least one ridge is oriented to extend substantially parallel with the elongate axis.

Optionally, the actuator mounting mechanism comprises an end stop for limiting movement of the actuator in at least one plane.

A third aspect of the present disclosure provides an apparatus for supplying user inputs to a computer program, such as a game program, for controlling the game program, comprising:

a case;

a plurality of controls located on a front and top of the apparatus;

a plurality of additional controls located on a rear of the apparatus; and the apparatus being shaped to be held in both hands of a user such that the user's thumbs are positioned to operate controls located on the front of the apparatus and such that the user's index fingers are positioned to operate controls located on the top of the apparatus;

the apparatus comprising at least one actuator mounted to the rear of the apparatus in a position operable by a middle, ring or little finger of a user;

the at least one actuator configured to activate at least two of the plurality of additional controls.

Optionally, the apparatus comprises:

an actuator mounting mechanism for mounting the at least one actuator to the case;

the plurality of additional controls comprises a plurality of sensors, each of the plurality of sensors configured to initiate a control function; and the at least one first actuator comprising:

a first end and a second end opposing the first end, the actuator being mounted to the case proximate the first end;

wherein the actuator mounting mechanism couples the at least one first actuator to the case, such that the second end of the at least one first actuator is a free to move with respect to the first end of the at least one first actuator and with respect to the case;

the at least one first actuator further comprising a plurality of degrees of freedom of movement, when mounted to the case, such that the at least one first actuator can interact with each of the plurality of sensors.

A fourth aspect of the present disclosure provides an actuator for use with apparatus for supplying user inputs to a computer program, such as a game program, for controlling the game program, the apparatus comprising:

a case;

a plurality of controls located on a front and top of the apparatus;

a plurality of additional controls located on a rear of the apparatus; and the apparatus being shaped to be held in both hands of a user such that the user's thumbs are positioned to operate controls located on the front of the apparatus and such that the user's index fingers are positioned to operate controls located on the top of the apparatus;

the apparatus comprising at least one actuator mounted to the rear of the apparatus in a position operable by a middle, ring or little finger of a user;

the at least one actuator configured to activate at least two of the plurality of additional controls.

Optionally, the actuator comprises:

an actuator mounting mechanism for mounting the actuator to the case; and a first end and a second end opposing the first end, the actuator being mountable to the case proximate the first end;

wherein the actuator mounting mechanism is configured to couple the actuator to the case, such that the second end of the actuator is a free to move with respect to the first end of the actuator and with respect to the case;

the actuator further comprising a plurality of degrees of freedom of movement, when mounted to the case, such that the actuator can interact with each of the plurality of controls.

In some embodiments the apparatus is a games controller. Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION

Detailed descriptions of specific embodiments of computer input apparatus, game controllers and actuators are disclosed herein. It will be understood that the disclosed embodiments are merely examples of the way in which certain aspects of the invention can be implemented and do not represent an exhaustive list of all of the ways the invention may be embodied. Indeed, it will be understood that the computer input apparatus, game controllers and actuators described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
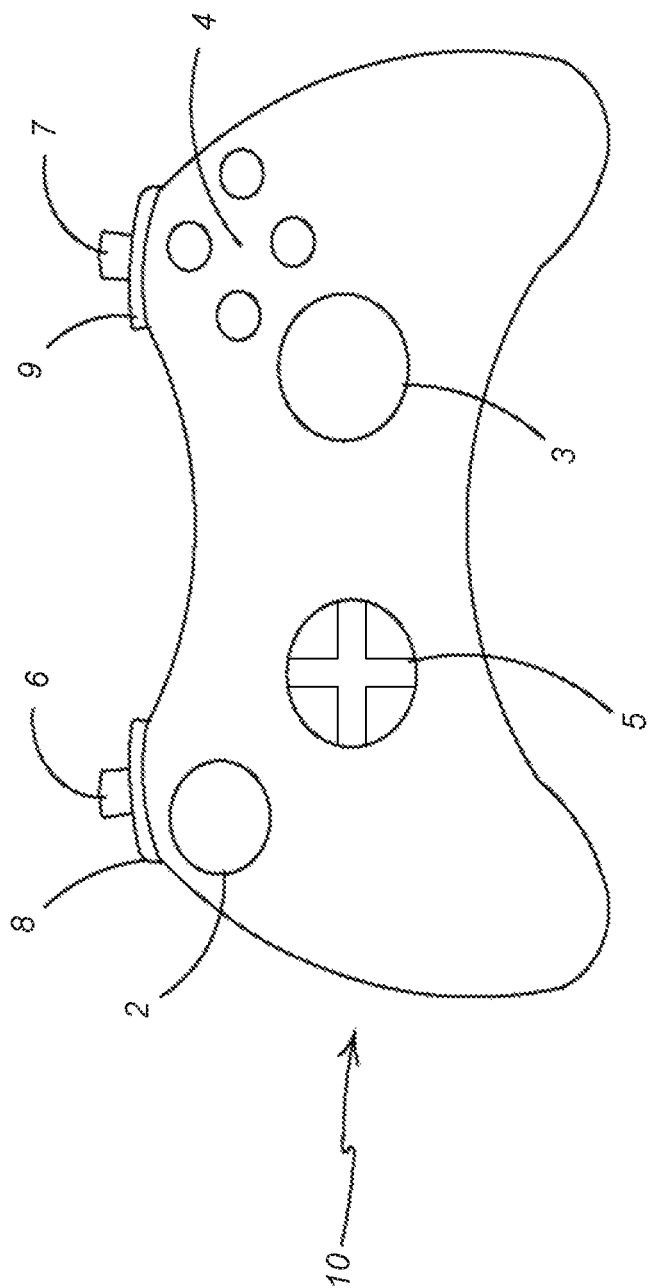
FIG. 1 is a schematic illustration of the front of a games console controller according to a first embodiment.

Referring to FIG. 1, there is shown a controller 10 according to an embodiment of the invention. The controller 10 comprises an arrangement of game controls that are mounted on the front and top of the controller 10. The controller 10 comprises a left analogue thumb stick 2 and a right analogue thumb stick 3 mounted on the front of the controller 10. The left analogue thumb stick 2 and the right analogue thumb stick 3 normally control movement actions and are intended to be operated by the user's left and right thumbs respectively. The controller 10 comprises four buttons 4, located on a forward right portion of the front of the controller 10, which normally control additional in-game actions and that are intended to be operated by the user's right thumb. The controller 10 comprises a direction pad 5 located on the rearward left portion of the front of the controller 10. The direction pad 5 is intended to be operated by the user's left thumb, and typically is used either as an alternative to the left thumb stick 2, or to provide additional actions. The controller 10 also comprises a left trigger body 6, a right trigger body 7, a left bumper 8 and a right bumper 9 located on the top of the controller 10. The left and right trigger bodies 6, 7 are typically operated by a user's index fingers or forefingers. The left and right bumpers 8, 9 may also be operated by a user's index fingers or forefingers. It will be understood that the arrangement of game controls illustrated in respect of the present embodiment is optional and may vary in other game controllers embodying the present invention, which may be applied to a variety of actuators as described below.

Figure 2:
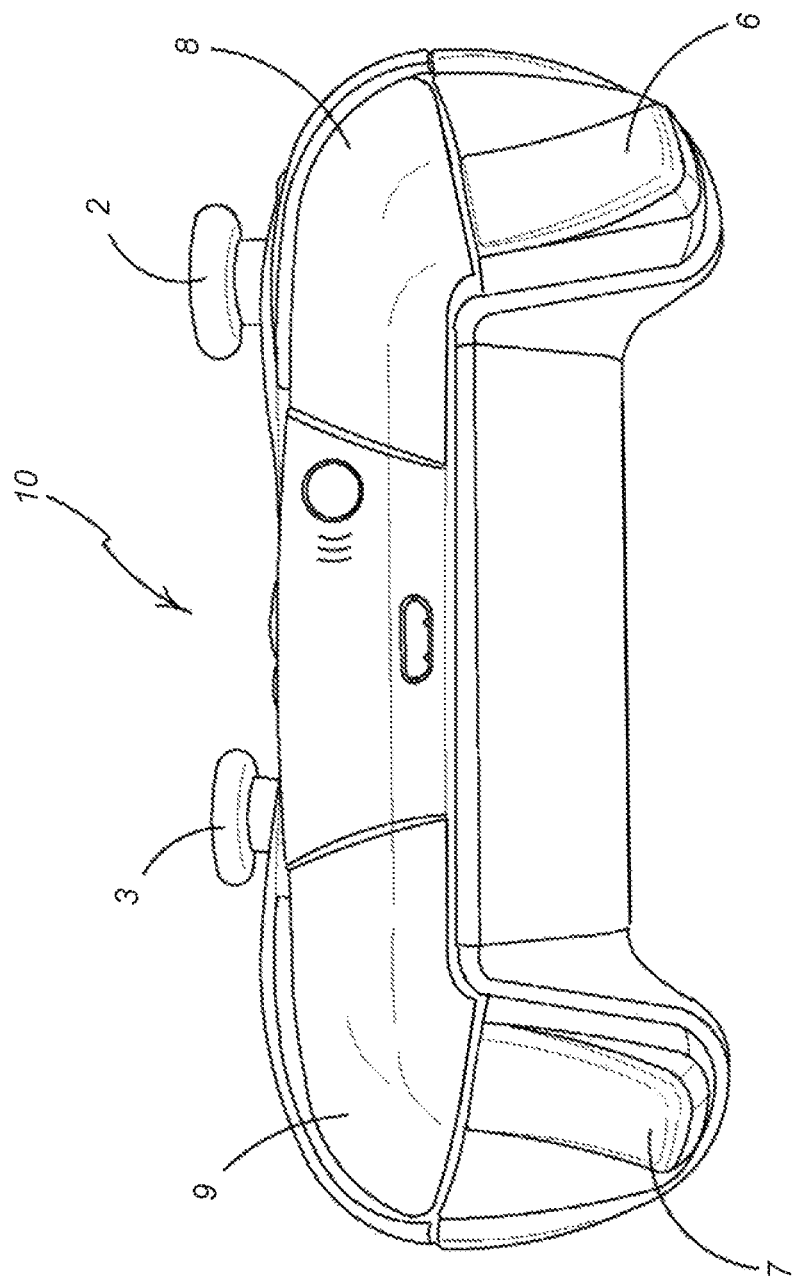
FIG. 2 is a top view of the games console controller of FIG. 1.

FIG. 2 illustrates a top view of the controller 10 of FIG. 1. It can be seen that the left trigger body 6 is mounted below the left bumper 8 and the right trigger body 7 is mounted below the right bumper 9.

A user may operate the four buttons 4 on the front of the controller by removing their right thumb from the right thumb stick 3 and placing their right thumb upon one or more of the four buttons 4. This operation takes time and, in some games, can cause a loss of control. This is a particular problem in applications requiring precision, for example combat games, where the right thumb stick 3 is used for aiming a weapons cross-hair or other reticle. A similar problem may arise in games where the direction pad 5 provides additional actions and the user is required to remove their left thumb from the left thumb stick 2 in order to operate the direction pad 5.

In light of the above, there is a need for an improved controller which removes the requirement for a user to remove their thumbs from the left or right thumb sticks 2, 3 in order to operate additional actions controlled by the four buttons 4 and/or the direction pad 5.

Figure 3:
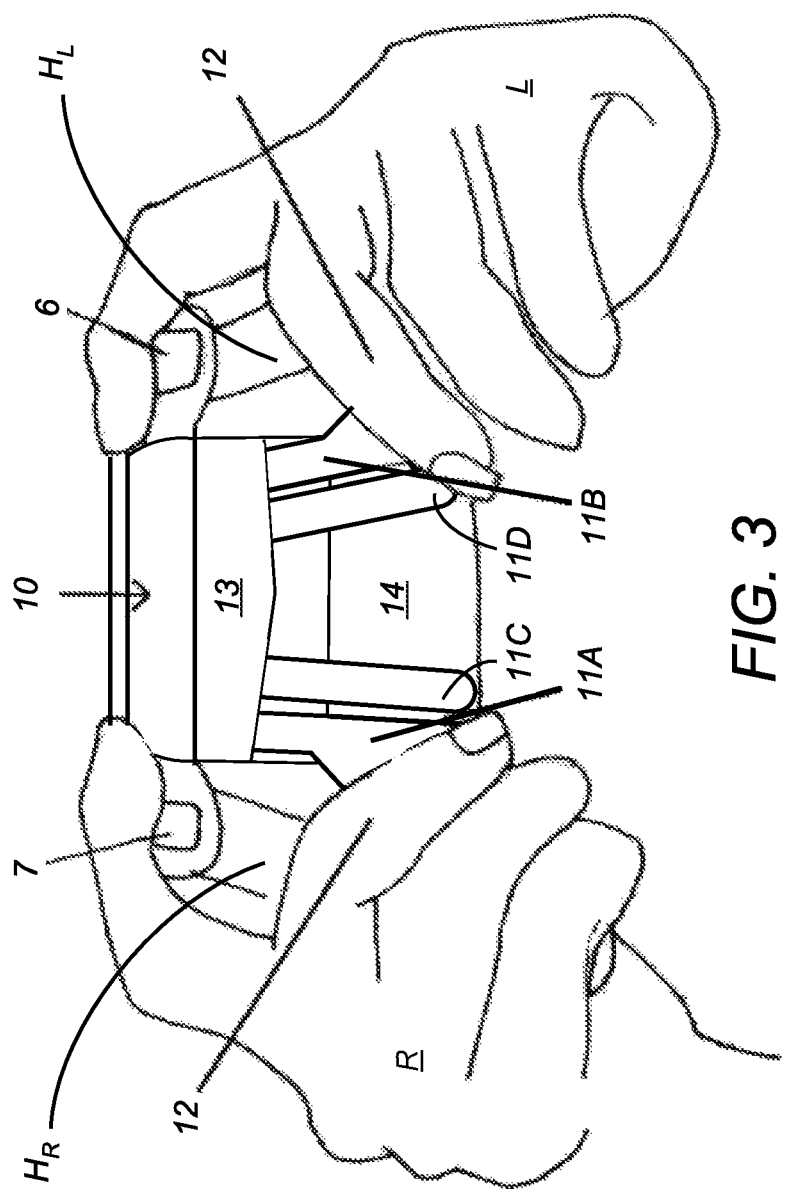
FIG. 3 is a schematic illustration from below of the rear panel of the games controller of FIG. 1 showing a user's hands.

The rear of the games controller 10 is illustrated in FIG. 3. The controller 10 comprises a first handle $H_R$ and a second handle $H_L$. The first handle $H_R$ and the second handle $H_L$ are disposed on opposing lateral sides of a central body portion 14. The first handle $H_R$ is intended to be grasped in the right hand R of a user 12. The second handle $H_L$ is intended to be grasped in the left hand L of a user 12. The user 12 wraps one or more of the middle, ring and little fingers of the right hand R about the first handle $H_R$. The user wraps one or more of the middle, ring and little fingers of the left hand L about the second handle $H_L$.

The controller 10 comprises one or more actuators in the form of paddle levers 11A, 11B, 11C, 11D. In the illustrated embodiment the controller 10 comprises four actuators: a first paddle lever 11A, a second paddle lever 11B, a third paddle lever 11C and a fourth paddle lever 11D, mounted on the rear of the controller 10. The paddle levers 11A, 11B, 11C, 11D are each individually or separately mounted in a detachable fashion; and in the illustrated embodiment any of the four actuators may be removed or omitted from the controller 10. The paddle levers 11A, 11B, 11C, 11D are positioned to be operated by the middle, ring or little fingers of a user 12, as shown in FIG. 3.

In the illustrated embodiment each of the four actuators extends substantially in a longitudinal direction. The longitudinal direction extends from the top—to which the right and left triggers 6, 7 are mounted—of the controller 10 to the bottom of the controller 10.

A user may displace or depress either of the paddle levers 11A, 11B, 11C, 11D by engaging an outer surface thereof; such displacement causes the actuated paddle 11A, 11B, 11C, 11D to activate a at least one switch mechanism.

Figure 4A:
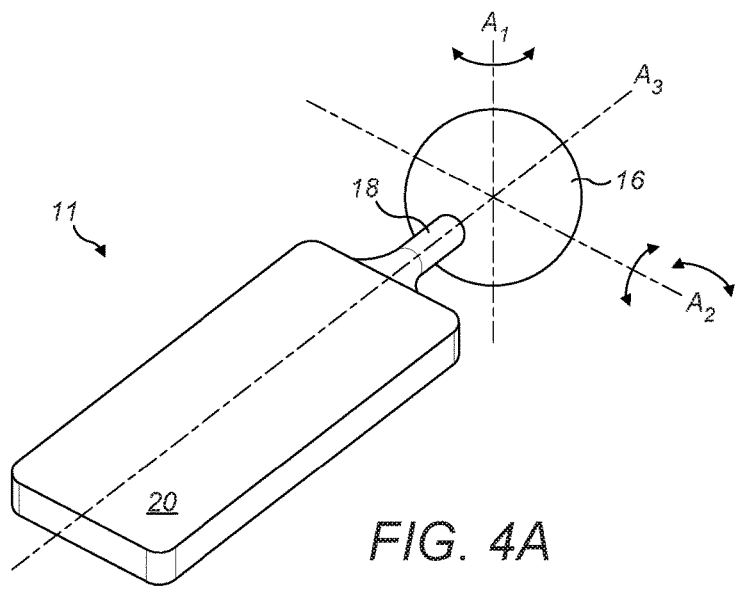
FIG. 4A is a perspective view of an actuator mechanism, according to a first embodiment, for mounting to the games controller of FIG. 3.
Figure 4B:
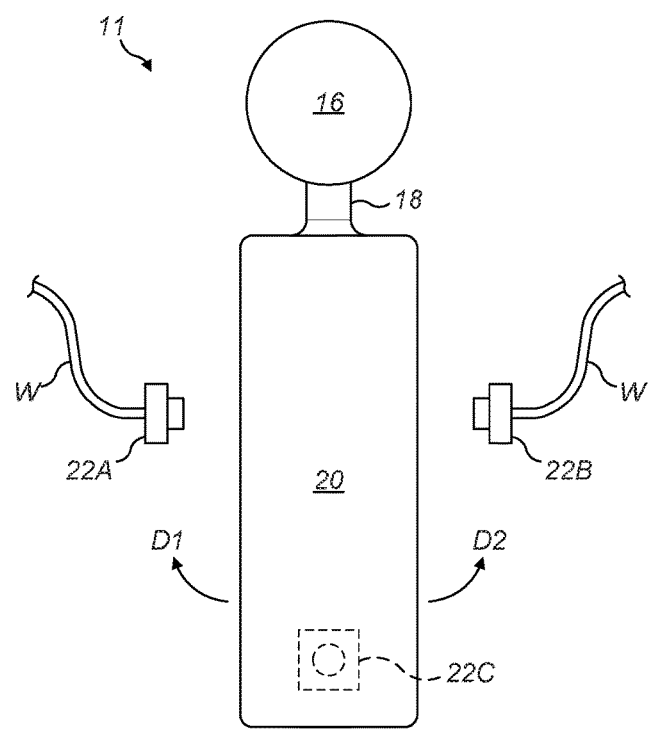
FIG. 4B is a plan view of the actuator mechanism of FIG. 4A.

Referring now to FIGS. 4A and 4B, there is shown a paddle or actuator 11 for use with the controller of FIGS. 1 to 3. The actuator 11 comprises a main body 20, a head 16 and an intermediate portion in the form of a shaft 18 coupling the head to the main body 20. The main body 20, head 16 and shaft 18 may be integrally formed as a unitary element. The head 16 forms part of a spherical bearing, the controller body comprises receiver in the form of a socket for receiving at least a portion of the head 16. In the illustrated embodiment the head 16 takes the form of a ball or sphere.

The actuator 11 is mounted to the controller a first end thereof by the head 16. A second end of the actuator 11 opposing the first end is free to move with respect to the first end. The actuator 11 is arranged to extend over an outer surface of the rear panel of the controller.

The controller comprises a first switch mechanism 22A and a second switch mechanism 22B and a third switch mechanism 22C. The third switch mechanism 22C is mounted in vertical registry with the main body 20 of the actuator 11. The third switch mechanism 22C is mounted, at least in part, within an interior of the controller body. The first and second switch mechanisms 22A, 22B are mounted on opposing sides of the main body 20 of the actuator 11.

The first and second switch mechanisms 22A, 22B are mounted orthogonally with respect to the third switch mechanism 22C.

The actuator 11 may be pivoted or rotated about a first axis A1 in a clockwise direction, as indicated by direction arrow D1, (when viewed from below) to activate first switch 22A. The actuator 11 may be pivoted or rotated about a first axis A1 in a counter-clockwise direction as indicated by direction arrow D2, to activate first switch 22B. The actuator 11 may be pivoted or rotated about a second axis A1 to activate third switch 22C.

In this way the actuator 11 may control three separate input functions or actions. The actuation force required to activate each of the first and second switches 22A, 22B may be different to the actuation force required to activate the third switch 22C.

The actuator 11 is arranged such that an inner surface of the main body 20 is disposed in close proximity (optionally in touching contact) with the third switch mechanism 22C when in a neutral or rest position.

Optionally, the actuator 11 comprises a first protuberance or boss (not shown) extending from a first, inner surface thereof. The first boss is arranged so as to engage with a switch mechanism when the actuator 11 is depressed proximate the second end of the actuator 11.

Figure 5:
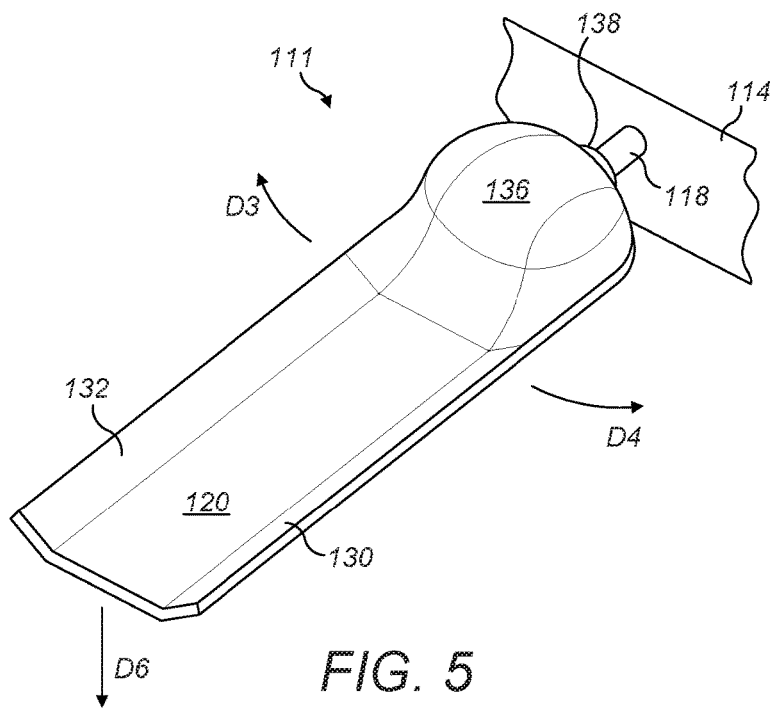
FIG. 5 is a perspective view of an actuator mechanism, according to a second embodiment, for mounting to the games controller of FIG. 3.

Referring now to FIG. 5, there is shown an alternative embodiment. In the second illustrated embodiment like numerals have, where possible, been used to denote like parts, albeit with the addition of the prefix "100" to indicate that these features belong to the third embodiment respectively. The alternative embodiment shares many common features with the first and second embodiments and therefore only the differences from the embodiments illustrated in FIGS. 1 to 4B will be described in any greater detail.

In the embodiment of FIG. 5, the actuator 111 comprises a socket 136. The controller body 114 comprises a ball 138 mounted on a shaft 118. The ball 138 forms a spherical bearing with the socket 136. The actuator 111 may be arranged to be detachably mounted to the controller.

The actuator 111 comprises a main body 120, the main body 120 comprises wings 130, 132. The wings 130, 132 extend along lateral edges of the main body 120 and are arranged to provide a ridge along each side edge of the main body 120. This may facilitate a user to displace the actuator from side to side as indicated by direction arrows D3, D4. In this way the main body 120 is shaped to receive a user's finger between a pair of substantially opposing engagement surfaces. The wings 130, 132 may also serve to guide the user towards an optimum location to engage the main body 120 to displace the main body 120, in the direction indicated by direction arrow D6, towards a switch mechanism (not shown) disposed in vertical registry with the actuator 111.

In alternative embodiments the main body 120 may comprise a centrally disposed ridge extending along a portion of the main body 120 so as to provide a pair of opposing engagement surfaces which are engageable by the user to facilitate movement in the directions indicated by direction arrows D3, D4.

Figure 6A:
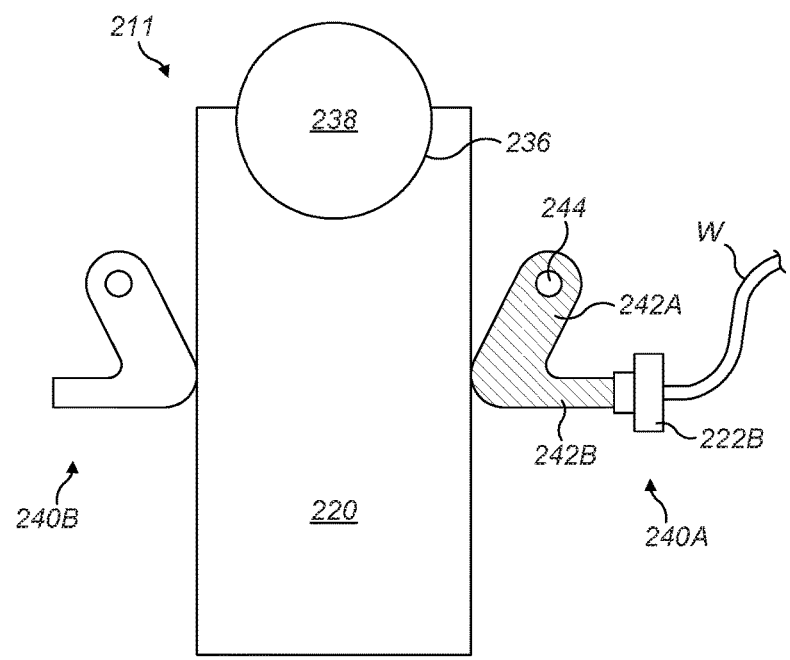
FIG. 6A is a plan view of an actuator mechanism, according to a third embodiment, for mounting to the games controller of FIG. 3.
Figure 6B:
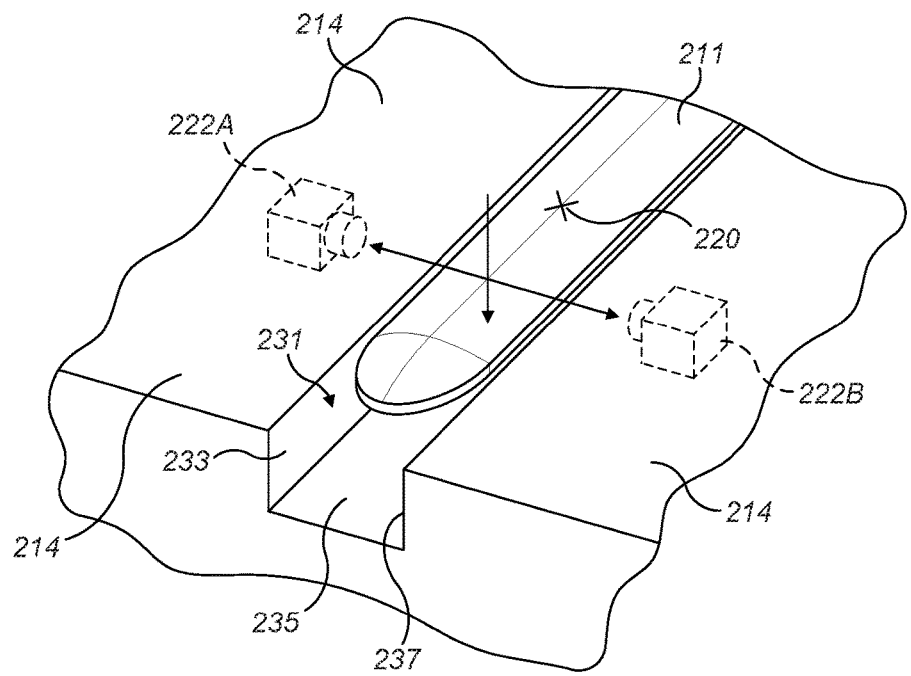
FIG. 6B is a perspective view of an actuator mechanism, according to a fourth embodiment, for mounting to the games controller of FIG. 3.

Referring now to FIGS. 6A and 6B, there is shown alternative embodiments of the present disclosure. In the third and fourth illustrated embodiment like numerals have, where possible, been used to denote like parts, albeit with the addition of the prefix "200". The alternative embodiments share many common features with the first and second embodiments and therefore only the differences from the embodiments illustrated in FIGS. 1 to 5 will be described in any greater detail. For example, the alternative embodiments include, among other things, actuator 211, main body 220, socket 236, and ball 238.

In the embodiment of FIG. 6A, controller comprises a mechanical linkage 240A, 240B to couple the actuator 111 to a respective one of the switch mechanisms 244 (only one is shown for illustrative purposes) disposed on opposing side of the main body 220. The linkage 240A allows the switches 244 to be laterally spaced from the side edges of the main body 220.

Each of the mechanical linkages 240A, 240B comprises a pair of legs which are arranged to be substantially "V" shaped. A first end of a first leg is connected to a first end of a second leg so as to define a vertex. The first leg is pivotally or rotationally coupled to the controller, for example, but not limited to, the back panel 914 of the controller—either to an external or internal surface thereof, to a chassis member or printed circuit board within an interior of the controller body. The pivot point 244 is disposed distally from the vertex defined by the intersection of the first and second legs. Optionally, the pivot point 244 is disposed proximate a second end of the first leg distal from the first end of the first leg. The mechanical linkages 240A, 240B are arranged such that a second end of the second leg can be engaged with a contact point of a respective one of the first and second switch mechanisms 222A, 222B.

The mechanical linkages 240A, 240B may comprise a resilient biasing mechanism such as a spring. The biasing mechanism biases the linkage to a first, rest, position. The mechanical linkages 240A 240B may be rotated about the pivot point 244 by displacement of the main body 220 of the actuator 211 so as to actuate the respective switch mechanism 222A, 222B.

Figure 6C:
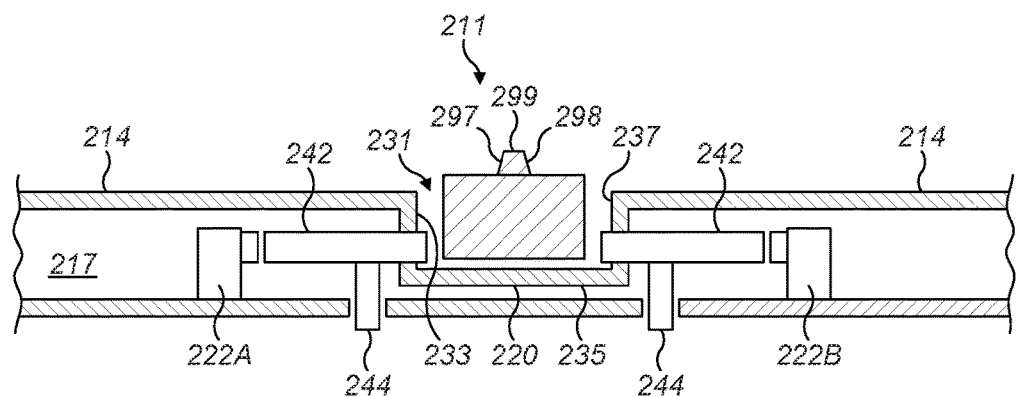
FIG. 6C is a schematic illustration of an actuator mechanism, according to the fourth embodiment of FIG. 6B, for mounting to the games controller of FIG. 3.

FIGS. 6B and 6C illustrates an embodiment in which the actuator 211 is mounted within a channel 231, a pair of switch mechanisms 222A, 222B are mounted within the interior of a controller body 214 on opposing sides of the channel 231. The controller comprises a linkage as illustrated in FIG. 6A for coupling the actuator 211 to each of the switch mechanisms 222A, 222B. A portion of the linkage 242 protrudes through the side walls 233, 237 of the channel 231. In this way lateral displacement of the actuator 211 can activate either of the pair of switch mechanisms 222A, 222B. In other embodiments, the actuator may comprise a projection or protuberance extending laterally from each side of thereof. The protuberances may engage with the one of the linkages 240A, 240B or may directly act upon a respective one of the pair of switch mechanisms 222A, 222B. Optionally, the actuator 211 may comprise a ridge or other projection 299 having a pair of opposed engagement surfaces 297, 298 for a user to engage so as to facilitate lateral movement of the actuator 211 within the channel 231.

In still other embodiments a portion of each of the pair of switch mechanisms 222A, 222B pair of switch mechanisms 222A, 222B may extend through an aperture in a respective one of the side walls 233, 237. Each of the side edges of the actuator 211 may engage with a respective one of the pair of switch mechanisms 222A, 222B.

Figure 6D:
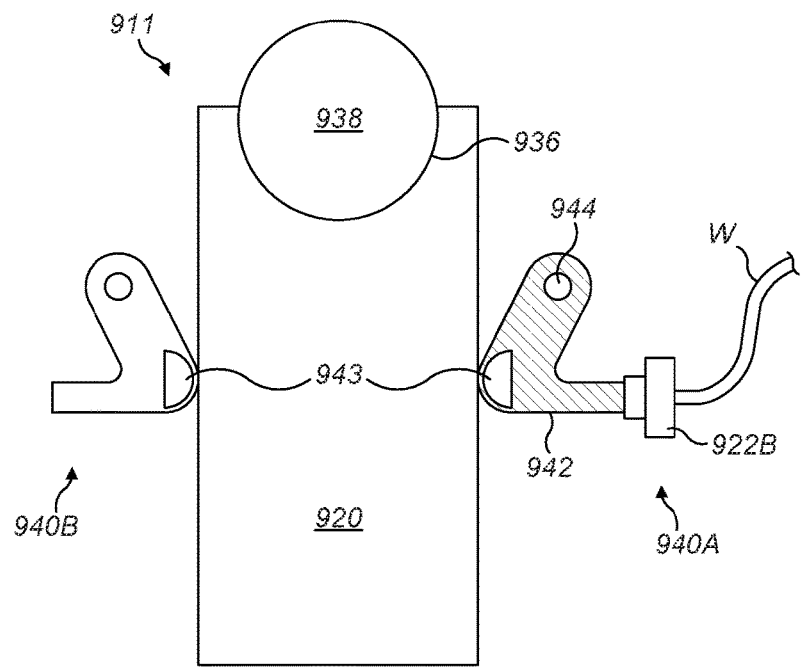
FIG. 6D is a plan view of an actuator mechanism, according to a fifth embodiment, for mounting to the games controller of FIG. 3.
Figure 6E:
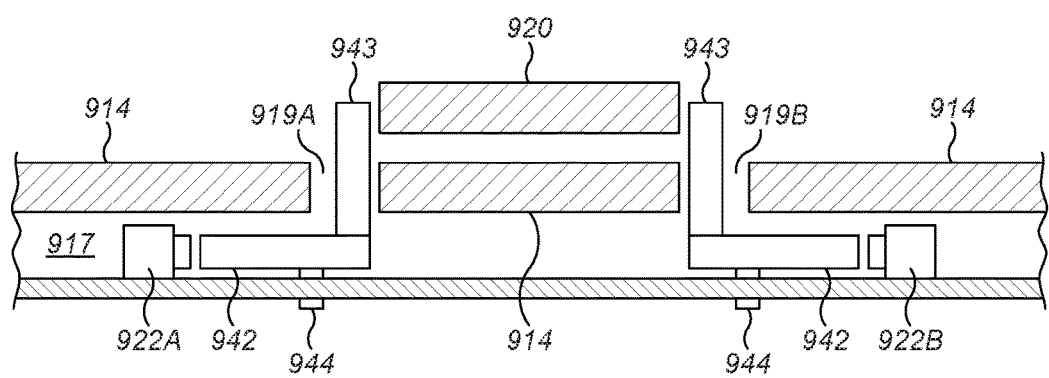
FIG. 6E is a schematic illustration of the actuator mechanism of FIG. 6D mounted to a games controller.

Referring now to FIGS. 6D and 6E, there is shown an alternative embodiment of the present disclosure. In the fifth illustrated embodiment like numerals have, where possible, been used to denote like parts, albeit with the addition of the prefix "900" to indicate that these features belong to the fifth embodiment. The alternative embodiment shares many common features with the previous embodiments and therefore only the differences from the embodiments illustrated in FIGS. 1 to 6C will be described in any greater detail.

In the embodiment of FIGS. 6D and 6E, the controller comprises a mechanical linkage 940A, 940B to couple the actuator 911 to a respective one of the switch mechanisms 922A, 922B (disposed on opposing side of the main body 920. The linkage 940A, 940B allows the switches 922A, 922B to be laterally spaced from the side edges of the main body 920. The linkage 940A, 940B allows the switches 922A, 922B to be vertically spaced from the main body 920 of the actuator 911. The switches 922A, 922B are disposed within the interior 917 of the controller body 914. The back panel 914 of the controller comprises a pair of openings or apertures 919A, 919B.

A portion 943 of first linkage 940A extends from the interior 917 of the controller and passes through the opening 919B so as to be disposed in part alongside a first side of the main body 920 of the actuator 911.

A portion 943 of second linkage 940B extends from the interior 917 of the controller and passes through the opening 919A so as to be disposed in part alongside a second side, opposing the first side, of the main body 920 of the actuator 911.

In the illustrated embodiment, the switch mechanisms 922A, 922B are mounted to a printed circuit board disposed within the controller, in other embodiments the switch mechanisms 922A, 922B may be mounted to a chassis member within the controller body or to an internal surface of the back panel 914.

Figure 6F:
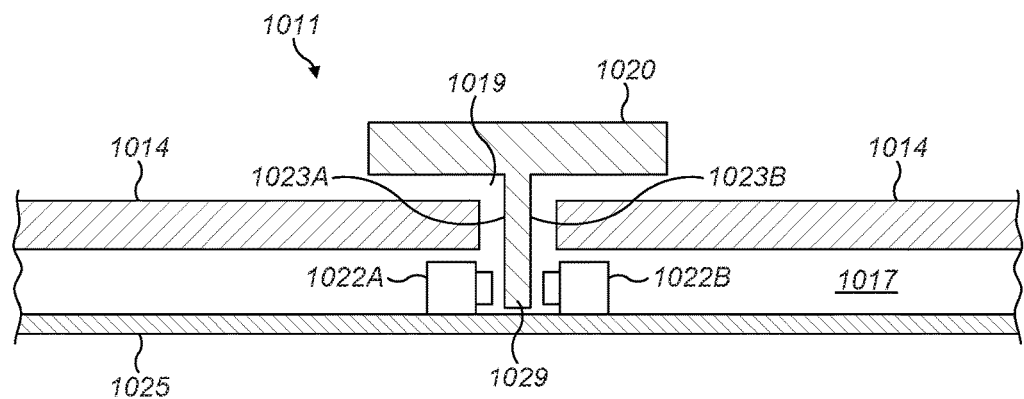
FIG. 6F is a schematic illustration of an actuator mechanism according to a sixth embodiment mounted to a games controller.

Referring now to FIG. 6F, there is shown an alternative embodiment of the present disclosure. In the sixth illustrated embodiment like numerals have, where possible, been used to denote like parts, albeit with the addition of the prefix "1000" to indicate that these features belong to the sixth embodiment. The alternative embodiment shares many common features with the previous embodiments and therefore only the differences from the embodiments illustrated in FIGS. 1 to 6E will be described in any greater detail.

The back panel 1014 of the controller comprises an opening or aperture 1019.

The actuator 211 comprises a lug or rib 1029 extending from an inner face thereof. The lug 1029 may be integrally formed with the actuator 1011.

The lug 1029 extends from the inner surface of the actuator 1011 and passes through the opening 1019 into the interior of the controller.

The controller comprises a pair of switch mechanisms 1022A, 1022B mounted to support member 1025 with contact points in opposition to each other. The lug 1029 is arranged to be disposed in part between the contact points of the switch mechanisms 1022A, 1022B. Lateral displacement in a first direction of the actuator 911 brings a first side wall 1023A of the lug 1029 into contact with the first switch mechanism 1022A. Lateral displacement in a second direction of the actuator 911 brings a second side wall 1023B of the lug 1029 into contact with the second switch mechanism 1022B.

In this way the actuator 1011 may activate either of the first or second switch mechanisms 1022A, 1022B.

In some embodiments a third switch mechanism (not shown in FIG. 6F) may be mounted to the support member 1025 in vertical registry with the main body 1020 of the actuator 1011. The third switch mechanism may be perpendicularly arranged with respect to the first and second switch mechanism 1022A, 1022B such that displacement of the main body 1020 towards the support member 1025 brings the main body 1020 or lug 1029 into contact with a contact point of the third switch mechanism so as to activate the third switch mechanism.

In the illustrated embodiment, the switch mechanisms 1022A, 1022B are mounted to support member 1025 which may be a printed circuit board disposed within the controller, in other embodiments the support member may be a chassis member within the controller body. In still further embodiments the switch mechanisms 1022A, 1022B may be mounted to an internal surface of the back panel 1014.

Figure 6G:
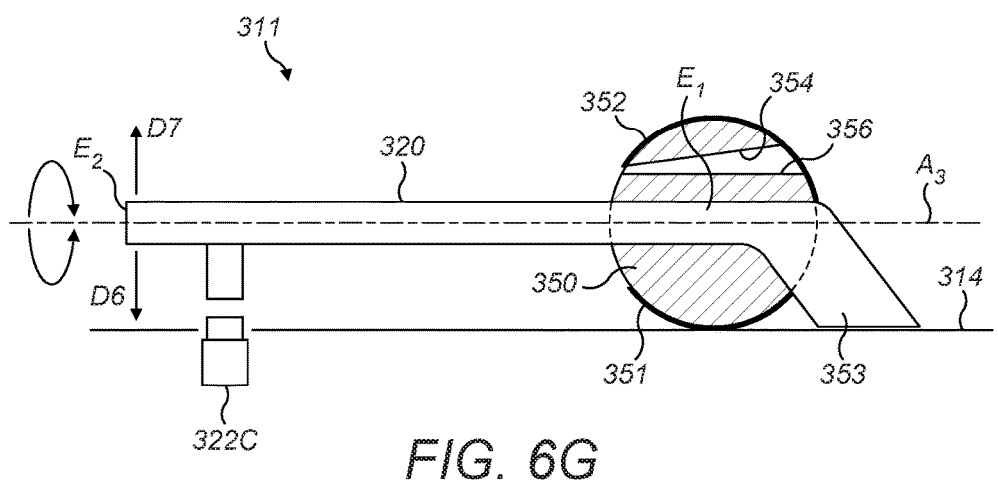
FIG. 6G is a schematic illustration of an actuator mechanism according to a seventh embodiment mounted to a games controller.

Referring now to FIG. 6G, there is shown an alternative embodiment of the present disclosure. In the seventh illustrated embodiment like numerals have, where possible, been used to denote like parts, albeit with the addition of the prefix "300" to indicate that these features belong to the seventh embodiment. The alternative embodiment shares many common features with the previous embodiments and therefore only the differences from the embodiments illustrated in FIGS. 1 to 6F will be described in any greater detail.

The embodiment of FIG. 6G comprises a spherical bearing or joint having a displacement limiter or end stop 352 for limiting the rotational movement of the free end of main body 320 of the actuator 311 away from the controller back panel 314, as indicated by direction arrow D7, whilst still allowing sufficient degree of rotation towards the controller back panel 314, as indicated by direction arrow D6, so as to enable the actuator 311 to activate a switch mechanism 322C disposed in vertical registry therewith. The ball 350 is truncated so as to provide an engagement surface 356. The end stop 352 comprises a surface 354 into which the engagement surface 356 of the ball 350 is brought into contact at the end of the range of motion; the ball 350 is mounted within the socket 351 which is provided in mount 353.

In some embodiments, the surface 354 or the surface 356 or both may be shaped to allow a range of rotational motion of the actuator 311 about the axis A3 which extends along an elongate axis of the actuator, that is to say between the rotationally mounted end $E_1$ and the free end $E_2$.

Figure 6H:
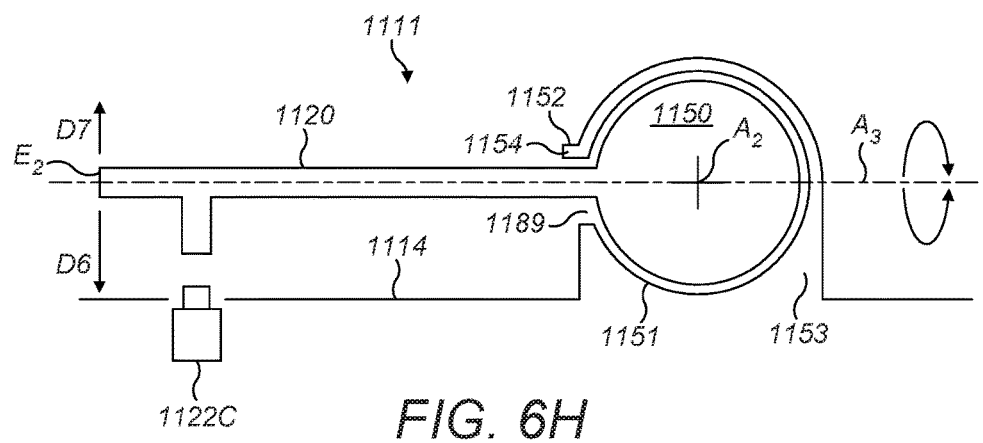
FIG. 6H is a schematic illustration of an actuator mechanism according to a thirteenth embodiment mounted to a games controller.

Referring now to FIG. 6H, there is shown an alternative embodiment of the present disclosure. In the thirteenth illustrated embodiment like numerals have, where possible, been used to denote like parts, albeit with the addition of the prefix "1100" to indicate that these features belong to the thirteenth embodiment. The alternative embodiment shares many common features with the previous embodiments and therefore only the differences from the embodiments illustrated in FIGS. 1 to 6G will be described in any greater detail.

The embodiment of FIG. 6H comprises a spherical bearing or joint having an alternative displacement limiter or end stop 1152 for limiting the rotational movement of the free end $E_2$ of the actuator 1111 away from the controller back panel 1114, that is to say about axis $A_2$, as indicated by direction arrow D7, whilst still allowing sufficient degree of rotation towards the controller back panel 1114, as indicated by direction arrow D6, so as to enable the actuator 1111 to activate a switch mechanism 1122C disposed in vertical registry therewith. A ball 1150 is mounted within a socket 1151 which is provided in mount 1153. The ball 1150 is mounted to the main body 1120 or to a shaft of the actuator 1111. The main body 1120 or shaft passes through an opening 1189 in the socket 1151. The end stop 1151 is disposed proximate the opening 1189 socket 1151, and may be integrally formed with the socket 1151. The end stop 1152 is provided by an extension of the socket which extends partial down the length of the main body 1120 (or shaft) of the actuator 1111. The end stop 1152 comprises a surface 354 into which an adjacent surface of the actuator 1111 is brought into contact so as to define the end of the range of motion.

The end stop 1152 may be configured to provide a desired range of motion in the direction D7, as illustrated the main body 1120 is substantially parallel with the controller back panel 1114, the end stop 1152 may prevent movement away from the controller back panel 1114 beyond the parallel position shown in FIG. 6H.

It will be appreciated that the end stop 1152 may be disposed to limit the range of motion about either of the other axes A1, A2 as shown in FIG. 4A. Further more than one end stop may be provided, in such embodiments the end stops may limit the range of motion about two or more axes. It will also be appreciated that the end stop may be configured to confine movement of the actuator into a desired plane or one or more predefined or distinct planes. For example, but not limited to, the opening 1189 may take the form of a cruciform, enabling movement in two planes and optionally rotation about axis $A_3$.

Referring now to FIGS. 7A to 8B, there are shown alternative embodiments of the present disclosure. In the eighth and ninth illustrated embodiments like numerals have, where possible, been used to denote like parts, albeit with the addition of the prefix "400", "500" to indicate that these features belong to the eighth and ninth embodiments respectively. The alternative embodiments share many common features with the previous embodiments and therefore only the differences from the embodiments illustrated in FIGS. 1 to 6H will be described in any greater detail.

Figure 7A:
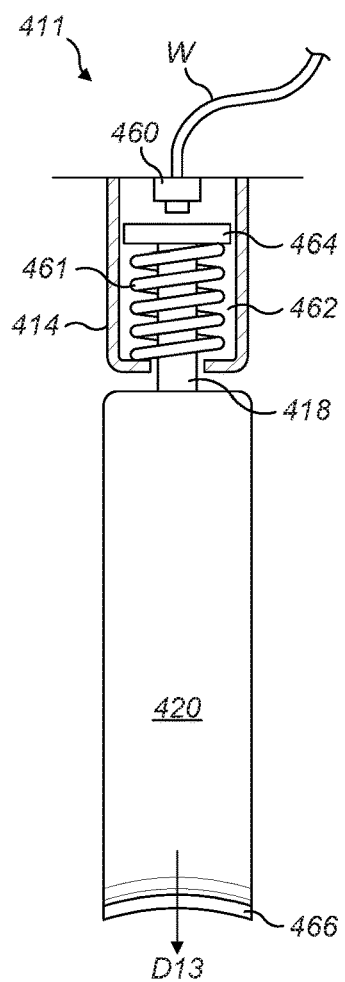
FIG. 7A is a plan view of an actuator mechanism, according to an eighth embodiment, for mounting to the games controller of FIG. 3.
Figure 7B:
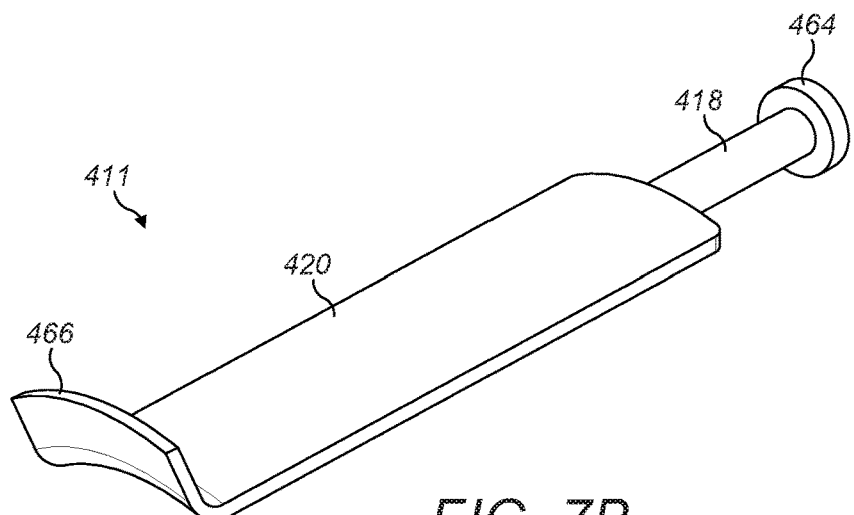
FIG. 7B is a perspective view of a portion of the actuator mechanism of FIG. 7A.

The embodiment of FIGS. 7A and 7B comprises an actuator 411 having a main body 420 coupled to a shaft 418 which in turn is coupled to a head 464. The head 464 is translationally mounted in a conduit or chamber 462 provided by a portion of the controller body 414. The head 464 and chamber 462 form a piston/cylinder like arrangement. A resilient biasing mechanism 461 in the form of a helical spring is mounted on the shaft 418 between the head 464 and a first end wall of the chamber 462. The shaft 418 passes through an aperture or opening in the first end wall. A switch mechanism 460 is mounted to a second end wall of the chamber 462. The second end wall opposes the first end wall. The switch mechanism 460 is electrically coupled W to a processor (not shown).

The switch mechanism 460 may be of the type in which the contacts are normally closed. The resilient biasing mechanism 461 biases the head of the actuator onto the switch so as to open the contacts. Thus when a user displaces the actuator 411 in the direction indicated by direction arrow D13, the contacts close so as to initial a control function on the controller.

The actuator may comprise a flange or lip 466. The flange 466 extends outwardly from an external surface of the actuator 411. Optionally, the flange 466 is disposed proximate the free end of the actuator 411. The free end of the actuator 411 is opposite the mounting end of the actuator at which the head 464 is disposed. Optionally, the flange 466 may have a curved surface, the curved surface may face towards the head 464 so as to face towards the switch mechanism 460 when the actuator 411 is mounted to a controller.

The flange 466 facilitates a user pulling the actuator 411 away from the switch mechanism 460 in the direction indicated by direction arrow D13.

In other embodiments the actuator 411 may be employed with a switch mechanism 460 in which the contacts are normally open. The switch mechanism 460 may be mounted in the first end wall of the chamber 462.

In still other embodiments the switch mechanism 460 and resilient biasing mechanism 461 may be arranged such that the user displaces or pushes the actuator in a direction opposite to the direction indicated by direction arrow D13, that is to say towards the second end wall of the chamber 462. In such embodiments the resilient biasing mechanism 461 may be disposed between the head 464 and the second end wall of the chamber 462.

The actuator 411 may be employed to activate an additional switch mechanism (not shown) the additional switch mechanism may be disposed in vertical registry with the main body of the actuator 411. A user may activate the additional switch mechanism by pressing upon the external surface of the main body 420. The actuator 411 may be flexible so as to be deformable or may be pivotally coupled to enable the actuator to interact with the additional switch mechanism. Resilient biasing may be employed to return the actuator to a rest position, this may be inherent in the material of the actuator or may be provided by a separate device. In this way the actuator 411 may be employed to activate a pair of switch mechanisms.

Figure 8A:
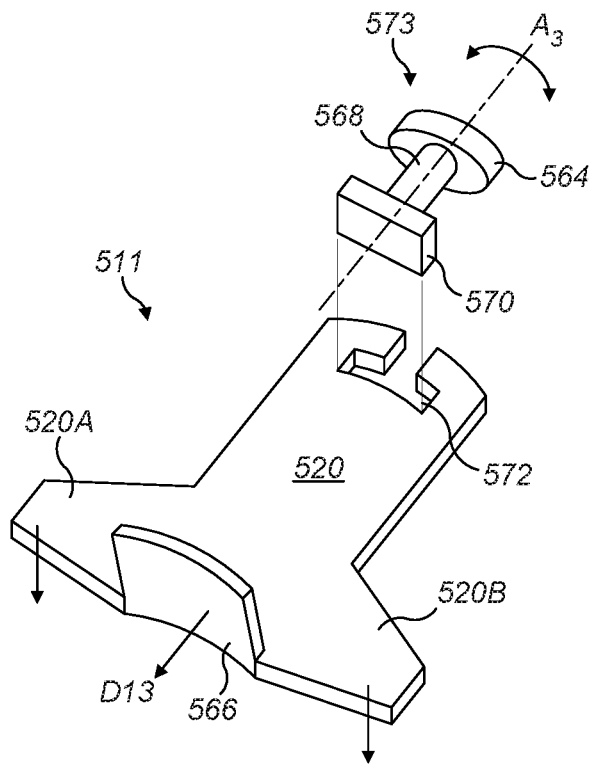
FIG. 8A is a perspective view of an actuator mechanism, according to a ninth embodiment, for mounting to the games controller of FIG. 3.
Figure 8B:
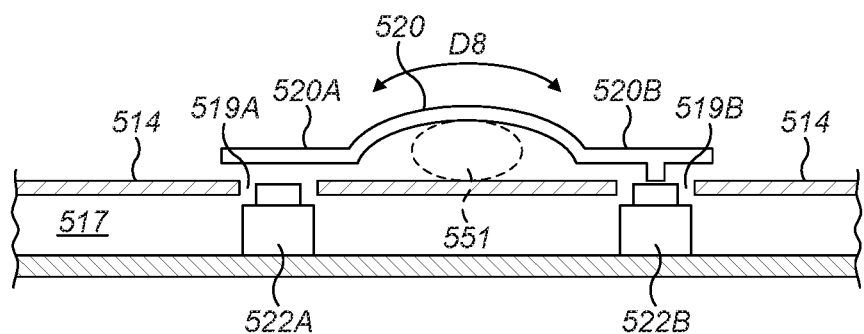
FIG. 8B is a schematic illustration of the actuator mechanism of FIG. 8A mounted to a controller.

The embodiment of FIGS. 8A and 8B comprises an actuator 511 having a main body 520. The main body 520 is detachably connected to a mount 573. The main body 520 comprises a receiver 572 for receiving a portion 570 of the mount 573. The mount 573 comprises a shaft 568 coupled to the receiver 570 at a first end; a head 564 is coupled to the shaft 568 at an opposing end thereof.

The head 564 is translationally mounted in a conduit or chamber provided on a back panel of the controller in a similar arrangement to that shown in FIG. 7A.

The main body 520 comprises a pair of wings or limbs 520A, 520B so as to actuate a respective pair of switch mechanisms 522A, 522B. A first wing 520A extends laterally from a first side edge of the main body 520. A second wing 520B extends laterally from a second, opposing, side edge of the main body 520. The first and second wings 520A, 520B are disposed proximate a first, free, end of the main body 520. The free end is opposite a second, mounting, end of the main body 520. The receiver 572 is disposed proximate the second end of the main body 520.

The actuator 511 may comprise a flange or lip 566. The flange 566 extends outwardly from an external surface of the actuator 511. Optionally, the flange 566 is disposed proximate the free end of the actuator 511. Optionally, the flange 566 may have a curved surface, the curved surface may face towards the receiver 570 so as to face towards a switch mechanism (not shown) when the actuator 511 is mounted to a controller.

The flange 566 facilitates a user pulling the actuator 511 away from the switch mechanism in the direction indicated by direction arrow D13.

The head 564 comprises an arcuate shape. In the illustrated embodiment the head 546 comprises an elliptical or oval shape. In alternative embodiments alternative shapes may be employed such as, but not limited to, circular or stadium shaped. (A stadium shape is a two-dimensional geometric shape constructed of a rectangle with semicircles at a pair of opposite sides. Alternative names include discorectangle and obround.)

The curved or arcuate shape of the head facilitates pivotal or rotational movement of the head 564 and hence the main body 520 about an axis $A_3$ which extends a substantially parallel with the shaft 568. That is to say the main body 520 can be pivoted about an axis which extends between the mounting end and the free end of the main body 520.

The first and second wings portions 520A, 520B facilitate this rotation by providing levers for rotating the main body in the clockwise and counter-clockwise direction, as indicated by direction arrow D8 in FIG. 8B, when the respective wing portion 520A, 520B is pressed towards the controller back panel.

In some embodiments a fulcrum or pivot point 551 may be provided between the main body 520 and the controller back panel 514. The fulcrum 551 may be mounted to an inner surface of the actuator 511 or alternatively to an outer surface of the controller back panel 514.

Optionally, the main body 520 may be formed with one or more tactile features to enable the user to locate the wings 520A, 520B. For example, but not limited to, the main body 520 may be convex in shape when viewed from an external view point in order, whereas the wings may have a planar shape. The wings 520A, 520B may comprise one or more embossments or debossments. The wings 520A, 520B may comprise a high friction coating or moulding (overmoulding).

Figure 8C:
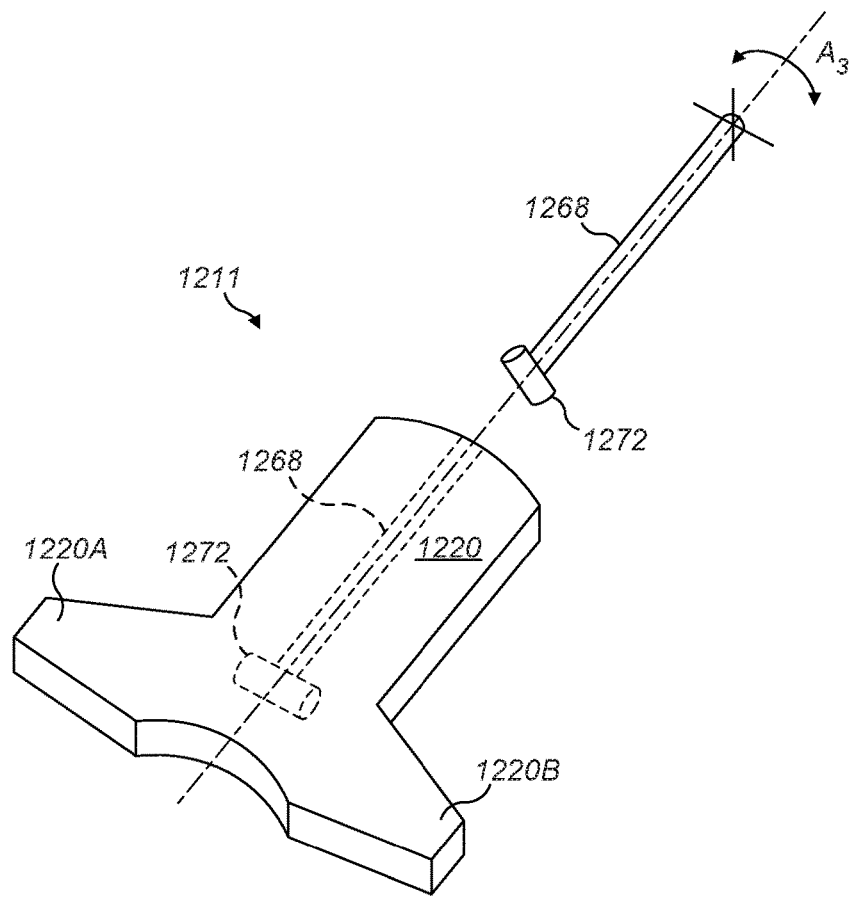
FIG. 8C is a perspective view of an actuator mechanism, according to a fourteenth embodiment, for mounting to the games controller of FIG. 3.
Figure 8D:
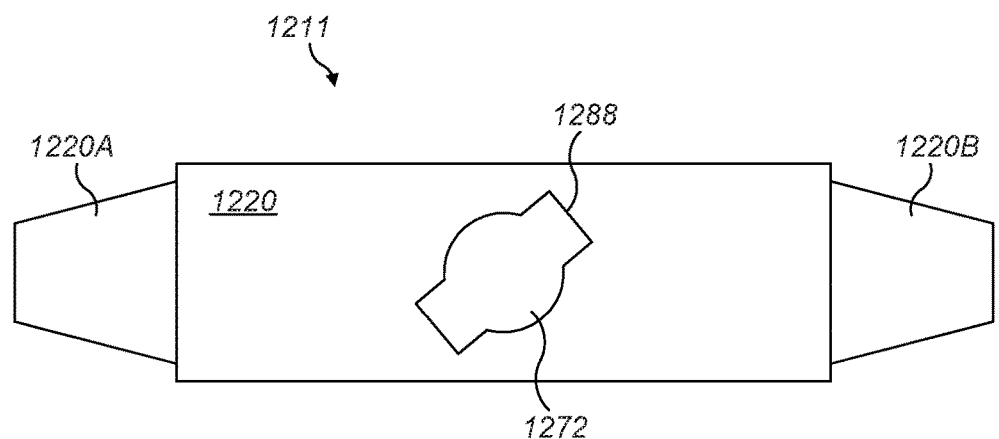
FIG. 8D is an end view of portion of the actuator mechanism of FIG. 8C.

Referring now to FIGS. 8C and 8D, there is shown an alternative embodiment of the present disclosure. In the fourteenth illustrated embodiments like numerals have, where possible, been used to denote like parts, albeit with the addition of the prefix "1200" to indicate that these features belong to the fourteenth embodiment. The alternative embodiment shares many common features with the previous embodiments and therefore only the differences from the embodiments illustrated in FIGS. 1 to 8B will be described in any greater detail.

The embodiment of FIGS. 8C and 8D comprises an actuator 1211 having a main body 1220. The main body 1220 is detachably connected to a shaft 1268. The main body 1220 comprises a receiver 1272 for receiving at least a portion of the shaft 1268. The shaft 1268 comprises a head 1264 at one end thereof.

The main body 1220 comprises a pair of wings or limbs 1220A, 1220B. A first wing 1220A extends laterally from a first side edge of the main body 1220. A second wing 1220B extends laterally from a second, opposing, side edge of the main body 1220. The first and second wings 1220A, 1220B are disposed proximate a first, free, end of the main body 1220. The free end is opposite a second, mounting, end of the main body 1220. The receiver 1272 is disposed proximate the second end of the main body 1220.

The receiver may take the form of an opening, orifice or tunnel, defining a bore within the main body 1220 of the actuator 1111. The receiver 1272 may comprise a key device 1288 so as to enable the main body 1220 to be locked onto the shaft 1268. In this way the main body 1220 cannot be unintentionally detached from the shaft 1268. The key device may comprise a keyway defined in the main body 1220 for receiver a counter part in the form of a head 1272. The head 1272 is shaped complementary to the keyway, and requires the head 1272 and keyway to be correctly aligned in order to couple the main body with the shaft 1268 or to decouple the main body 1220 from the shaft 1268.

In order to lock or secure the main body 1220 onto the shaft 1268 the shaft must be fully inserted into the main body 1220 the main body 1220 can be secured to the shaft 1268 be rotating the main body 1220 relative to the shaft 1268, dashed or phantom lines indicate the locked position of the head 1272 and shaft 1268 within the main body 1220. The orientation of the head 1272 relative to the keyway is then altered such that the shaft 1268 cannot be withdrawn until the main body 1220 is again rotated relative to the shaft 1268 such that the head 1272 is once again correctly aligned with the keyway.

It will be appreciated that the main body 1220 may be rotatable relative to the shaft 1268 about the axis $A_3$ so as to enable the wing portion to be rotated to engage switch mechanisms disposed in vertical registry therewith. In this way the main body 1220 is rotatably mounted upon the shaft 1268.

Figure 9A:
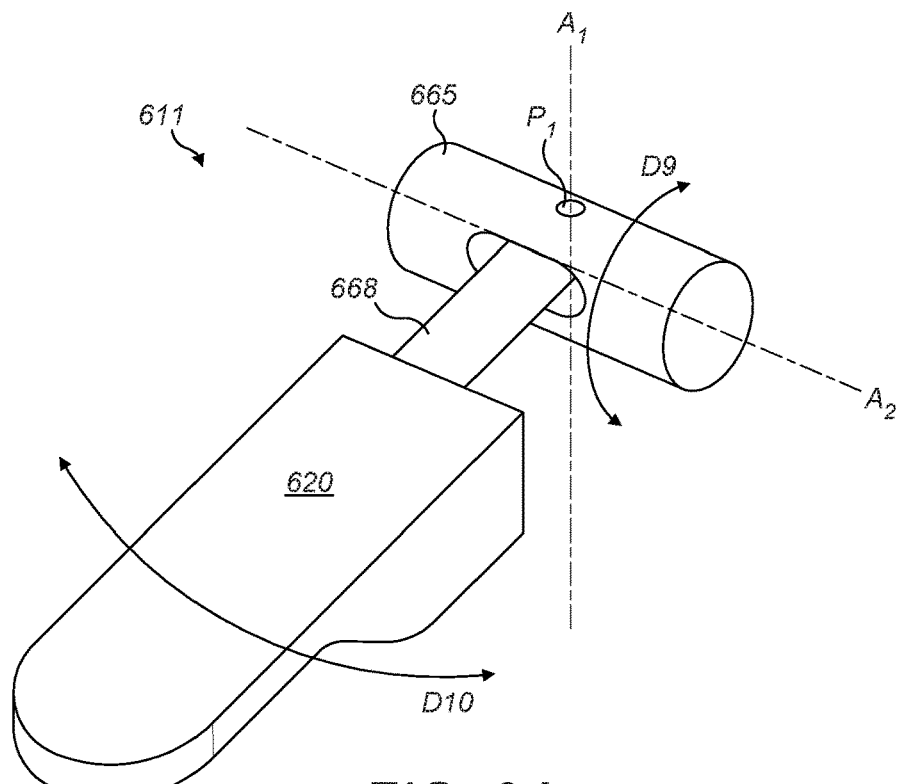
FIG. 9A is a perspective view of an actuator mechanism, according to a tenth embodiment, for mounting to the games controller of FIG. 3.
Figure 9B:
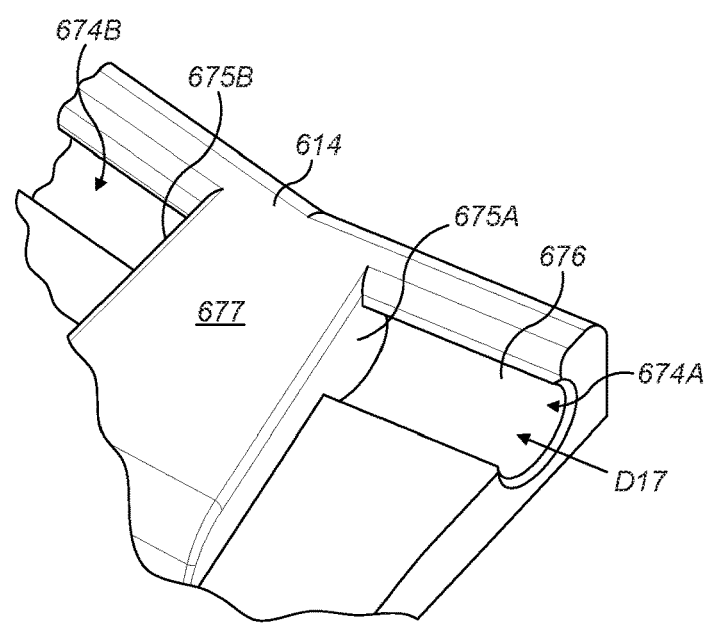
FIG. 9B is a perspective view of a portion of a controller capable of receiving the actuator mechanism of FIG. 9A of FIG. 10.
Figure 10:
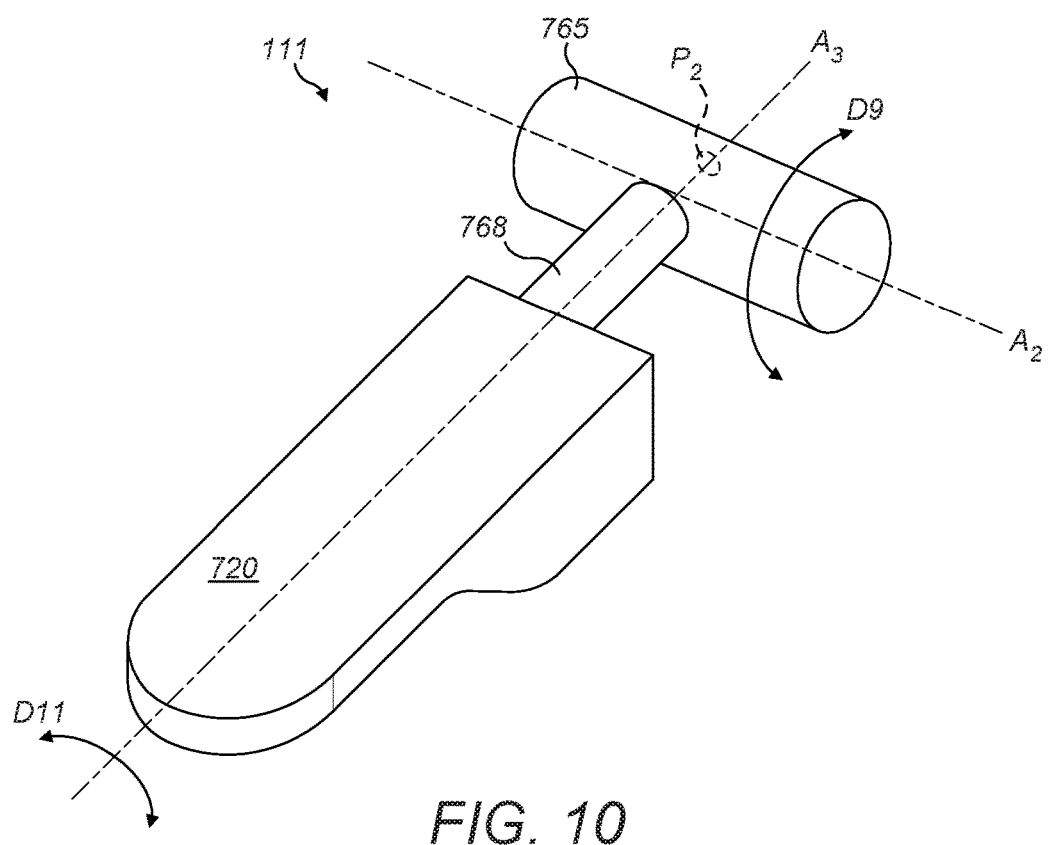
FIG. 10 is a perspective view of an actuator mechanism, according to an eleventh embodiment, for mounting to the games controller of FIG. 3.

Referring now to FIGS. 9A to 10, there is shown an alternative embodiments of the present disclosure. In the tenth and eleventh illustrated embodiments like numerals have, where possible, been used to denote like parts, albeit with the addition of the prefix "600", "700" to indicate that these features belong to the tenth and eleventh embodiments respectively. The alternative embodiments share many common features with the previous embodiments and therefore only the differences from the embodiments illustrated in FIGS. 1 to 8D will be described in any greater detail.

The paddle lever or actuator 611 comprises a head 665 in the form of a cylinder at a first end thereof, a shaft 668 is pivotally coupled to the head 665 at a first end and is mounted to a main body 620 of the actuator 611 at a second opposing end. The head 665 forms a trunnion, which enables the actuator 611 to be mounted on the controller, and operates as a pivot point or fulcrum about which the actuator 611 may be rotated.

The shaft 668 and the main body 620 of the actuator 611 can be rotated in a first plane, as indicated by direction arrow D10, about a first axis $A_1$. Axis $A_1$ is orthogonal to a second, cylindrical, axis $A_2$ of the head 655. In alternative embodiments the shaft 668 and/or main body 620 may be flexible so as to be deformable in the first plane.

The head 665, shaft 668 and the main body 620 of the actuator 611 can be rotated in a second plane about the cylindrical axis $A_2$, as indicated by direction arrow D9. The second plane is orthogonal to the first plane.

The controller comprises a body having a hack panel 614. The back panel 614 comprises a first trough or channel 674A and a second trough or channel 674B. The first channel 674A is separated from the second channel 674B by an upstand 677 defining a first end wall 675A and a second end wall 675B. The first end wall 674A closes an end of the first channel 674A. The second end wall 675B closes an end of the second channel 675B.

Optionally, the first channel 674A is arranged diverge with respect to the second channel 674B.

In some embodiments the controller comprises a cover panel or hatch. The hatch may be detachably mounted to the body 614. The hatch may comprise the first channel 674A and the second channel 674B.

The first channel 674A and the second channel 674B are arranged to be complementary in shape to the head 665 of the actuator 611. The first and second channels 674A, 674B can be considered to define a circular bore having a longitudinal cutaway 676 therealong—a partial cylinder—the longitudinal cutaway taking the form of a slot.

The first and second channels 674A, 674B provide a cradle or receiver in which the head 665 of a respective actuator 611 are received. The first and second channels 460A, 460B are arranged such that the actuator 611 cannot be withdrawn through the longitudinal cutaway 676. The first and second channels 674A, 674B extend greater than 50% about the circumference of the head 665.

The width dimension of the longitudinal cutaway 676 is less than the maximum width dimension or diameter of the head 665.

The shaft 668 of an actuator 611 extends through the longitudinal cutaway 676 in the first and second channels 674A, 674B.

The heads 665 of a respective actuator 611 are inserted into the first or second channel 674A, 674B by inserting through the open end of the first or second channel 674A, 674B as indicated by direction arrow D17.

The first and second channels 674A, 674B are sized to closely fit the head 655 of an actuator 611 disposed therein.

The body 614 may comprise one or more magnets (not shown) such as, but not limited to, permanent magnets. A magnet may be located in vertical registry with an actuator 611 in each of the first and second channels 674A, 674B. The actuators 611 may comprise a ferrous or magnetic material.

The magnets pull or attract the actuators 611 towards the body 614.

The magnets may hold the main portion 620 of the actuators 611 in sliding contact with the body 614.

In this way the magnets inhibit rotation of the actuators 611 away from the outer surface of the body 614, whilst allowing rotation of the main portion 620 of the actuators 611 with respect to the head 665.

In alternative embodiments the actuator may comprise an end stop in the form of a ridge or projection extending from an outer surface of the shaft 668 or head 665, the end stop may be configured to limit the angular range of motion of the actuator 611 in a direction away from the outer surface of the body 614.

In some embodiments, one or resilient biasing mechanisms may be provided to bias the actuator into a rest position. The rest position may be one in which the actuator 611 is in touching, contact with a switch mechanism (not shown) disposed in vertical registry with the main body 620 of the actuator 611. The bias force however would be insufficient to overcome the actuation force of the switch mechanism. A user would need to apply a force of sufficient magnitude by pressing the main body 620 towards the hack panel 614 in order to actuate the switch mechanism. The pressing force may result in a rotational movement of the actuator about the axis $A_2$ or a deformation or bending of the actuator 611.

The actuator 611 may be employed to activate switch mechanisms (not shown) which are located on opposite, sides of the main body 620. The actuator may be rotated so as to actuate a switch mechanism in a similar manner to that described in relation to the embodiment of FIGS. 4A to 6F.

FIG. 10 illustrates art alternative embodiment in which the main body 620 and shaft 668 are rotationally mounted about a third axis $A_3$ so as to be rotational in third plane. Third axis $A_3$ is orthogonal to both the first and second axes $A_1$, $A_2$. The third plane is orthogonal to the first and second planes.

The actuator 711 comprises a head 765 in the form of a cylinder at a first end thereof, a shaft 768 is pivotally coupled to the head 765 at a first end and is mounted to a main body 720 of the actuator 711 at a second opposing end. The head 765 forms a trunnion, which enables the actuator 711 to be mounted on the controller, and operates as a pivot point or fulcrum about which the actuator 711 may be rotated.

The head 765 can be mounted in a cradle or receiver on the controller, as illustrated and described in relation to FIG. 9B.

The actuator 711 of FIG. 10 can be rotated about the axis $A_3$, as indicated to by direction arrow D11 to actuate switch mechanisms (not shown) in a similar manner to that described in relation to the embodiment of FIGS. 8A and 8B. In some embodiments the actuator 711 may comprise wing portions extending laterally from opposing side edges thereof.

Figure 11A:
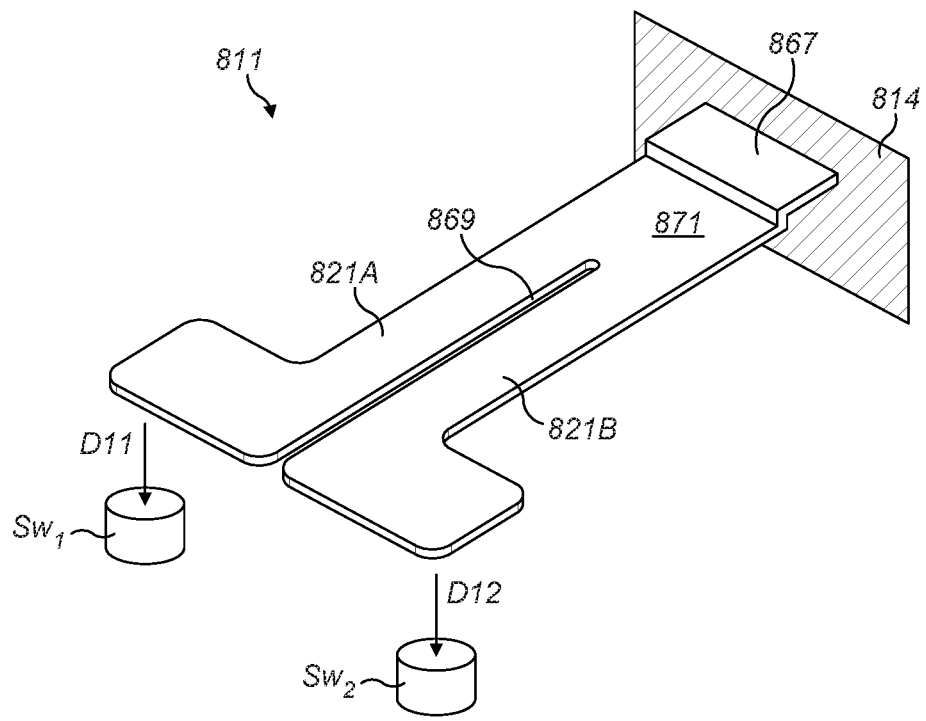
FIG. 11A is a perspective view of an actuator mechanism, according to a twelfth embodiment, for mounting to the games controller of FIG. 3.
Figure 11B:
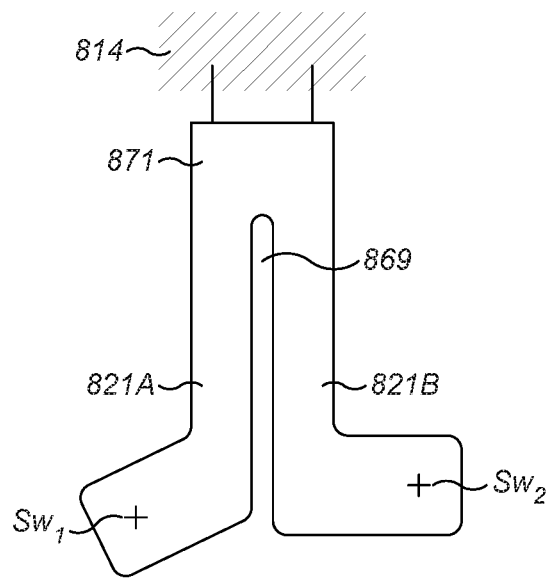
FIG. 11B is a plan view of the actuator mechanism of FIG. 11A.

Referring now to FIGS. 11A and 11B, there is shown an alternative embodiments of the present disclosure. In the twelfth illustrated embodiment like numerals have, where possible, been used to denote like parts, albeit with the addition of the prefix "800" to indicate that these features belong to the twelfth embodiment. The alternative embodiment shares many common features with the previous embodiments and therefore only the differences from the embodiments illustrated in FIGS. 1 to 10 will be described in any greater detail.

FIGS. 11A and 11B illustrate an actuator 811 comprising a head 867 for mounting to the actuator 811 to a controller. The actuator 811 comprises a pair of tail portions 821A, 821B coupled to the head 867 by an intermediate portion 871.

In the illustrated embodiment the pair of tail portions 821A, 821B are integrally formed with the intermediate portion 871 and with the head 867. A first tail portion 821A is separated form a second tail portion 821B by a cutaway in the form of a slot 869. The first and second tail portions are flexible and resiliently biased to return to a rest position. The resilient bias may be provided by a separate biasing mechanism or may be inherent in the material from which the actuator is formed, that is to say the material has sufficient inherent resilience or elasticity.

Each of the pair of tail portions 821A, 821b may be independently displaced with respect to each other so as to actuate a respective one of a pair of switch mechanisms $Sw_1$, $Sw_2$. A first switch mechanism $Sw_1$ is disposed in vertical registry with the first tail portion 821A. A second switch mechanism $Sw_2$ is disposed in vertical registry with the second tail portion 821A. The first and second switch mechanisms $Sw_1$, $Sw_2$ are mounted to or within the controller.

In this way the actuator 811 may be employed to activate a first control function by displacement of the first tail portion 821A, the actuator 811 may be employed to activate a second control function by displacement of the second tail portion 821A. The controller may employ logic, implemented either in hardware or software, to determine that both the first and second tail portion 821A, 821B have been displaced to activate both switch mechanisms $Sw_1$, $Sw_2$ to control a third control function.

The present disclosure provides a controller and an actuator for mounting to a controller, enables a user with access to a plurality (two or more) of control functions from a single actuator. In particular, the present disclosure provides an actuator which in normal use is hidden from view for example, but not limited to, by being mounted to the rear of a controller. It is therefore desirable that the actuator can be readily found by touch and that the user can readily find a desired control function. The actuator comprises a plurality of distinct or distinguishable degrees of freedom of movement, when mounted to the controller, the actuator requires specific actuation gestures, manipulations or actions to activate a desired one of a plurality of control functions associated with the actuator.

The actuator comprises a first end and a second end opposing the first end, the actuator is mountable to the controller by a mounting mechanism proximate the first end. The second end of the actuator is a free to move with respect to the first end and with respect to the controller.

The actuator may be substantially elongate in shape, that is to say it is longer than it wide. The length of the actuator is defined between the first end and the second end, the width is defined laterally between side edges of the actuator. In this way a user may be able to simultaneously place two or more fingers upon the actuator.

The actuator can be actuated by pivotal or rotational movement about at least two orthogonal axes or by pivotal or rotational movement about at least a first axis and bending, deformation or other displacement about a further orthogonal axis.

The actuator may comprise at least two independently displaceable portion each of which can be displaced by pivotal or rotational movement, bending, deformation or other displacement about an axis.

The actuator can be actuated by; translational movement of the actuator along an elongate axis, (the elongate axis extends between a first, fixed end of the actuator and a second opposing end of the actuator), or by pivotal or rotational movement, bending, deformation or other displacement about a further axis orthogonal to the elongate axis.

In some of the foregoing embodiments the actuators are pivotally mounted to the controller, the actuator comprising a lug for being received in a receiver which may be in the form of a conduit or channel, the lug being inserted into the receiver by linear translation along a longitudinal axis of the receiver, the longitudinal axis of the receiver defining a pivot axis about which the actuators rotate.

It is envisaged that the controllers may be coupled to a games console or computer by a wired connection or by a wireless connection device.

The actuators may be toollessly coupled to, and uncoupled from, the controller.

It can be appreciated that various changes may be made within the scope of the present invention. Whilst in the foregoing embodiments the actuator mechanism has been described with reference to a hand held games controller for use with a home video games console or other personal computer, in alternative embodiments the actuator mechanism may be employed with other hand held electronic devices, for example but not limited to a portable handheld games console (a single unit comprising the console, screen, speakers, and controls), a mobile telephone, tablet computer, phablet computer. The actuator mechanism may be integrated within such portable devices or may form part of an accessory apparatus such as, but not limited to, a case or caddy or other removable jacket arranged to accommodate the portable input device for use with a virtual reality system.

In some embodiments the actuator may be flexible so as to be deformable, the actuator may be displaced by bending rather than by pivotal movement. Such deformation may be possible in one of more directions, such that the actuator can be displaced in two or more orthogonal planes. In other embodiments the actuator may be pivotally coupled for rotational movement in at least one plane, for example, but not limited to two planes, optionally the two planes are orthogonal to one another, and may be deformable in a third plane, optionally the third plane may be orthogonal to one or both of said two planes. The actuator may be biased to return to an initial or rest position, optionally the actuator is inherently resiliently biased.

In this way it will be appreciated that flexible displacement of the actuator may be employed in replacement of pivotal or rotational coupling of the actuator about at least one axis.

In some embodiments the first and or second paddle levers may comprise a recess or cutaway on an inner surface thereof, the recess or cutaway being provided to receive the wing portion of the third or fourth paddle lever respectively.

It will be recognized that as used herein, directional references such as "top", "bottom", "front", "back", "end", "side", "inner", "outer", "upper" and "lower" do not limit the respective features to such orientation, but merely serve to distinguish these features from one another.

What is claimed is:

1. An apparatus for supplying user inputs to a computer program, the apparatus comprising:
   a case having a first part of a complementary mounting mechanism;
   a plurality of sensors each of the plurality of sensors configured to initiate a control function; and
   at least one first actuator comprising:
      a first end and a second end opposing the first end;

a second part of the complementary mounting mechanism disposed proximate the first end;

wherein the second part of the complementary mounting mechanism mates with the first part of the complementary mounting mechanism to couple the at least one first actuator to the case, such that the second end of the at least one first actuator is a free to move with respect to the first end of the at least one first actuator and with respect to the case;

the at least one first actuator further comprising a plurality of degrees of freedom of movement, when mounted to the case, such that the at least one first actuator is configured to move in at least two planes with respect to the case to interact with each of the plurality of sensors.

2. The apparatus of claim 1 wherein the at least one first actuator requires a specific actuation manipulation to activate each of a plurality of control functions associated with the at least one first actuator.

3. The apparatus of claim 1 wherein the at least one first actuator is substantially elongate in shape, and comprises an elongate axis defined between the first end and the second end.

4. The apparatus of claim 3 wherein the at least one actuator is slidably mounted to the case such that the at least one actuator is linearly moveable along the elongate axis.

5. The apparatus of claim 3 wherein the at least one actuator comprises a pair of wing portions extending laterally from side edges of the at least one actuator.

6. The apparatus of claim 5 wherein a first wing portion facilitates rotation of the at least one actuator in a clockwise direction about the elongate axis, and a second wing portion facilitates rotation of the at least one actuator in a counter-clockwise direction about the elongate axis.

7. The apparatus of claim 5 wherein the apparatus comprises a pair of sensors each of which mounted in vertical registry with a respective one of the pair of wing portions.

8. The apparatus of claim 3 wherein the actuator comprises at least one ridge for providing a pair of opposing engagement surfaces.

9. The apparatus of claim 8 wherein the at least one ridge is oriented to extend substantially parallel with the elongate axis.

10. The apparatus of claim 1 wherein the at least one first actuator is pivotally coupled to the case about at least two orthogonal axes so as to be rotatable in the at least two planes that are orthogonal to each other.

11. The apparatus of claim 1 wherein the at least one first actuator is flexible so as to be deformable in at least one plane of the at least two planes.

12. The apparatus of claim 1 wherein the at least one first actuator is flexible so as to be deformable in the at least two planes, and wherein the at least two planes are orthogonal to each other.

13. The apparatus of claim 1 wherein the at least one first actuator is pivotally coupled to the case about at least one axis and is flexible so as to be deformable about another axis that is orthogonal to the at least one axis.

14. The apparatus of claim 1 wherein the at least one first actuator comprises at least two displaceable portions each of which can be independently displaced about at least one axis.

15. The apparatus of claim 14 wherein the at least one first actuator comprises a head portion to which the at least two independently displaceable portions are each mounted, the head portion being mounted to the case of the apparatus.

16. The apparatus of claim 14 comprising a first sensor activateable by a first displaceable portion to initiate a first control function and a second sensor activateable by a second displaceable portion to initiate a second control function.

17. The apparatus of claim 16 wherein the first sensor and the second sensor are simultaneously activateable by a respective one of the first and second displaceable portions to initiate a third control function.

18. The apparatus of claim 1 wherein the at least one actuator is translationally mounted to the case so as to activate each one of the plurality of sensors by linear movement.

19. The apparatus of claim 18 wherein the apparatus comprises a sensor which is normally in a closed condition, and a resilient biasing mechanism which urges the at least one actuator into a rest position so as to act upon the sensor to place the sensor in an open condition.

20. The apparatus of claim 19 wherein the case comprises a chamber in which a portion of the at least one actuator and at least a portion of the sensor and the resilient biasing mechanism are mounted.

21. The apparatus of claim 18 wherein the at least one actuator comprises flange which comprises an engagement surface for a user's finger.

22. The apparatus of claim 1 wherein the at least one actuator comprises a head portion and a main body portion, the main body portion being detachably mounted to the head portion.

23. The apparatus of claim 22 wherein the head portion defines a trunnion and the main body portion is coupled to the head portion by a shaft, the shaft being rotationally coupled to the head portion.

24. The apparatus of claim 1 wherein the actuator is mounted to the case by a mechanism selected from the group consisting of: a ball and socket arrangement, a spherical bearing and a trunnion and cradle arrangement.

25. The apparatus of claim 24 wherein the cradle defines a receiver in the form of a channel, the trunnion includes a lug being inserted into the receiver by linear translation along a longitudinal axis of the receiver, the longitudinal axis of the receiver defining a pivot axis about which the actuators rotate.

26. The apparatus of claim 1 wherein the apparatus comprises a pair of sensors arranged in opposition to each other.

27. The apparatus of claim 1 comprising a first sensor mounted in a first orientation and a second sensor mounted in a second orientation, and wherein the at least one actuator is manipulable to activate each of the first and second sensors individually.

28. The apparatus of claim 27 wherein the second orientation is arranged orthogonally with respect to the first orientation.

29. The apparatus of claim 1 comprising a first sensor disposed proximate a first side edge of the actuator.

30. The apparatus of claim 1 comprising a linkage in communication with the first sensor and the actuator.

31. The apparatus of claim 30 wherein a portion of the linkage passes through an opening in the case.

32. The apparatus of claim 1 wherein the actuator comprises a lug passing through an opening in the case and the apparatus comprises a first sensor disposed on a first side of the lug and a second sensor disposed on second side of the lug.

33. The apparatus of claim 1 wherein the actuator comprises a main body portion shaped to receive a user's finger between a pair of substantially opposing engagement surfaces.

34. The apparatus of claim 1 wherein the apparatus comprises a channel in the case, at least a portion of the actuator being disposed in the channel, the channel comprising opposing side walls and base wall.

35. The apparatus of claim 34 wherein at least one of the opposing side walls of the channel comprises at least one sensor.

36. The apparatus of claim 34 wherein the base wall of the channel comprises at least one sensor.

37. The apparatus of claim 1 comprising an end stop for limiting movement of the actuator in at least one plane.

38. An actuator for use with an apparatus for supplying user inputs to a computer program, such as a game program, for controlling the game program, the apparatus comprising:
- a case having a first part of an actuator mounting mechanism;
- a plurality of sensors each of the plurality of sensors configured to initiate a control function; and
- the actuator comprising:
  - a first end and a second end opposing the first end;
  - a second part of the actuator mounting mechanism disposed proximate the first end;
  - wherein the first and second parts of the actuator mounting mechanism are cooperable to enable the second end of the actuator to move with respect to the first end of the actuator and with respect to the case;
  - the actuator comprising a plurality of degrees of freedom of movement, when mounted to the case, such that the actuator is configured to move in at least two planes with respect to the case to interact with each of the plurality of sensors.

39. The actuator of claim 38 wherein the actuator mounting mechanism comprises an end stop for limiting movement of the actuator in at least one plane of the at least two planes.

40. An apparatus for supplying user inputs to a computer program, such as a game program, for controlling the game program, comprising:
- a case;
- a plurality of controls located on a front and top of the apparatus;
- a plurality of additional controls located on a rear of the apparatus; and
- the apparatus being shaped to be held in both hands of a user such that the user's thumbs are positioned to operate controls located on the front of the apparatus and such that the user's index fingers are positioned to operate controls located on the top of the apparatus;
- the apparatus comprising at least one actuator mounted to the rear of the apparatus in a position operable by a middle, ring or little finger of a user;
- the at least one actuator is configured to move in at least two planes with respect to the case to activate at least two of the plurality of additional controls.

41. The apparatus of claim 40 comprising:
- an actuator mounting mechanism for mounting the at least one actuator to the case;
- the plurality of additional controls comprises a plurality of sensors, each of the plurality of sensors configured to initiate a control function; and
- the at least one actuator comprising:
  - a first end and a second end opposing the first end, the actuator being mounted to the case proximate the first end;
  - wherein the actuator mounting mechanism couples the at least one actuator to the case, such that the second end of the at least one actuator is a free to move with respect to the first end of the at least one actuator and with respect to the case;
  - the at least one actuator further comprising a plurality of degrees of freedom of movement, when mounted to the case, such that the at least one actuator can is configured to move in the at least two planes to interact with each of the plurality of sensors.

42. An actuator for use with apparatus for supplying user inputs to a computer program, such as a game program, for controlling the game program, the apparatus comprising:
- a case;
- a plurality of controls located on a front and top of the apparatus;
- a plurality of additional controls located on a rear of the apparatus; and
- the apparatus being shaped to be held in both hands of a user such that the user's thumbs are positioned to operate controls located on the front of the apparatus and such that the user's index fingers are positioned to operate controls located on the top of the apparatus;
- the apparatus comprising an actuator mounted to the rear of the apparatus in a position operable by a middle, ring or little finger of a user;
- the actuator is configured to move in at least two orthogonal planes with respect to the case to activate at least two of the plurality of additional controls.

43. The actuator of claim 42 comprising:
- an actuator mounting mechanism for mounting the actuator to the case; and
- a first end and a second end opposing the first end, the actuator being mountable to the case proximate the first end;
- wherein the actuator mounting mechanism is configured to couple the actuator to the case, such that the second end of the actuator is a free to move with respect to the first end of the actuator and with respect to the case;
- the actuator further comprising a plurality of degrees of freedom of movement, when mounted to the case, such that the actuator is configured to move in the at least two orthogonal planes to interact with each of the plurality of controls.

* * * * *